US008219446B1

(12) United States Patent
Mowry

(10) Patent No.: US 8,219,446 B1
(45) Date of Patent: *Jul. 10, 2012

(54) METHOD AND SYSTEM FOR COMPILING A CONSUMER-BASED ELECTRONIC DATABASE, SEARCHABLE ACCORDING TO INDIVIDUAL INTERNET USER-DEFINED MICRO-DEMOGRAPHICS

(75) Inventor: Craig P. Mowry, Southampton, NY (US)

(73) Assignee: Home Producers Network, LLC, Scottsdale, AZ (US)

( * ) Notice: Subject to any disclaimer, the term of this patent is extended or adjusted under 35 U.S.C. 154(b) by 256 days.

This patent is subject to a terminal disclaimer.

(21) Appl. No.: 12/777,070

(22) Filed: May 10, 2010

Related U.S. Application Data

(63) Continuation of application No. 09/808,538, filed on Mar. 14, 2001, now Pat. No. 7,720,707, which is a continuation-in-part of application No. 09/756,581, filed on Jan. 8, 2001, now abandoned.

(60) Provisional application No. 60/175,093, filed on Jan. 7, 2000, provisional application No. 60/176,440, filed on Jan. 14, 2000, provisional application No. 60/189,060, filed on Mar. 14, 2000, provisional application No. 60/212,663, filed on Jun. 20, 2000, provisional application No. 60/226,672, filed on Aug. 22, 2000.

(51) Int. Cl.
 *G06Q 30/00* (2006.01)
 *G07G 1/14* (2006.01)
(52) U.S. Cl. ...................... 705/14.1; 705/14.4
(58) Field of Classification Search .......... 705/14.1, 705/14.4
 See application file for complete search history.

(56) References Cited

U.S. PATENT DOCUMENTS

| 5,041,972 | A | 8/1991 | Frost |
| 5,661,516 | A | 8/1997 | Carles |
| 5,717,923 | A | 2/1998 | Dedrick |
| 5,724,424 | A | 3/1998 | Gifford |
| 5,754,939 | A | 5/1998 | Herz et al. |
| 5,784,095 | A | 7/1998 | Robbins et al. |
| 5,794,210 | A | 8/1998 | Goldhaber et al. |
| 5,848,397 | A | 12/1998 | Marsh et al. |

(Continued)

FOREIGN PATENT DOCUMENTS

AU 2002357397 7/2003

(Continued)

OTHER PUBLICATIONS http://web.archive.org/web/19981212013921/http://facebook.com/.

(Continued)

*Primary Examiner* — Arthur Duran
(74) *Attorney, Agent, or Firm* — Ostrolenk Faber LLP

(57) ABSTRACT

A system and method for providing an individual with advertisement information. At least one database including electronic trait information, electronic preference information and electronic advertiser information is stored on at least one database. One or more communication devices receive a first electronic request for first information from a first computing device, and determine first electronic responsive information that comprises information that is at least responsive to the first electronic request. Further, a user relevance factor is determined that represents a relevance of the advertiser information to the first user. First advertisement information is determined for at least one of branded products and services. The first advertisement information and the first electronic responsive information are transmitted to the first user computing device.

75 Claims, 19 Drawing Sheets

U.S. PATENT DOCUMENTS

| | | | |
|---|---|---|---|
| 5,852,775 | A | 12/1998 | Hidary |
| 5,855,515 | A | 1/1999 | Pease et al. |
| 5,956,691 | A | 9/1999 | Powers |
| 5,974,398 | A | 10/1999 | Hanson et al. |
| 6,020,884 | A | 2/2000 | MacNaughton et al. |
| 6,052,122 | A | 4/2000 | Sutcliffe et al. |
| 6,105,001 | A | 8/2000 | Masi et al. |
| 6,112,186 | A * | 8/2000 | Bergh et al. .................. 705/7.32 |
| 6,175,831 | B1 | 1/2001 | Weinreich et al. |
| 6,193,610 | B1 | 2/2001 | Junkin |
| 6,216,133 | B1 | 4/2001 | Masthoff |
| 6,236,975 | B1 * | 5/2001 | Boe et al. .................... 705/7.32 |
| 6,236,978 | B1 | 5/2001 | Tuzhilin |
| 6,269,361 | B1 | 7/2001 | Davis et al. |
| 6,288,717 | B1 | 9/2001 | Dunkle |
| 6,321,221 | B1 * | 11/2001 | Bieganski .................... 705/26.7 |
| 6,324,566 | B1 | 11/2001 | Himmel et al. |
| 6,338,094 | B1 | 1/2002 | Scott et al. |
| 6,351,736 | B1 | 2/2002 | Weisberg |
| 6,411,949 | B1 | 6/2002 | Schaffer |
| 6,466,918 | B1 | 10/2002 | Spiegel et al. |
| 6,480,785 | B1 | 11/2002 | Joerg et al. |
| 6,487,539 | B1 | 11/2002 | Aggarwal et al. |
| 6,519,629 | B2 | 2/2003 | Harvey et al. |
| 6,527,557 | B2 | 3/2003 | Lemay et al. |
| 6,546,545 | B1 | 4/2003 | Honarvar et al. |
| 6,601,037 | B1 | 7/2003 | Kolls |
| 6,604,086 | B1 | 8/2003 | Kolls |
| 6,606,605 | B1 | 8/2003 | Kolls |
| 6,609,103 | B1 | 8/2003 | Kolls |
| 6,609,120 | B1 | 8/2003 | Honarvar et al. |
| 6,615,183 | B1 | 9/2003 | Kolls |
| 6,625,581 | B1 | 9/2003 | Perkowski |
| 6,629,080 | B1 | 9/2003 | Kolls |
| 6,681,369 | B2 | 1/2004 | Meunier et al. |
| 6,684,197 | B1 | 1/2004 | Kolls |
| 6,757,661 | B1 | 6/2004 | Blaser et al. |
| 6,792,411 | B1 | 9/2004 | Massey, Jr. |
| 6,807,532 | B1 | 10/2004 | Kolls |
| 6,871,186 | B1 | 3/2005 | Tuzhilin et al. |
| 6,873,965 | B2 | 3/2005 | Feldman et al. |
| 6,886,000 | B1 | 4/2005 | Aggarwal et al. |
| 6,901,406 | B2 | 5/2005 | Nabe et al. |
| 6,925,468 | B1 | 8/2005 | Bobbitt et al. |
| 6,930,676 | B2 | 8/2005 | De Haan et al. |
| 6,947,976 | B1 | 9/2005 | Devitt et al. |
| 6,952,741 | B1 | 10/2005 | Bartlett et al. |
| 6,968,315 | B1 | 11/2005 | Nakisa |
| 6,970,844 | B1 | 11/2005 | Bierenbaum |
| 6,973,439 | B1 | 12/2005 | Wilk |
| 6,976,439 | B2 | 12/2005 | Uchida |
| 6,999,987 | B1 | 2/2006 | Billingsley et al. |
| 7,003,546 | B1 | 2/2006 | Cheah |
| 7,006,979 | B1 | 2/2006 | Samra et al. |
| 7,014,469 | B1 | 3/2006 | Nocera et al. |
| 7,031,651 | B2 | 4/2006 | McCormick et al. |
| 7,043,531 | B1 | 5/2006 | Seibel et al. |
| 7,054,831 | B2 | 5/2006 | Koenig |
| 7,054,900 | B1 | 5/2006 | Goldston |
| 7,082,427 | B1 | 7/2006 | Seibel et al. |
| 7,085,820 | B1 | 8/2006 | Nickerson et al. |
| 7,095,426 | B1 | 8/2006 | Childress |
| 7,120,629 | B1 | 10/2006 | Seibel et al. |
| 7,158,986 | B1 | 1/2007 | Oliver et al. |
| 7,231,608 | B1 | 6/2007 | Fano et al. |
| 7,236,969 | B1 | 6/2007 | Skillen et al. |
| 7,318,224 | B2 | 1/2008 | Honarvar et al. |
| 7,321,233 | B2 | 1/2008 | Strid et al. |
| 7,330,850 | B1 | 2/2008 | Seibel et al. |
| 7,337,127 | B1 | 2/2008 | Smith et al. |
| 7,356,541 | B1 | 4/2008 | Doughty |
| 7,398,219 | B1 | 7/2008 | Wolfe |
| 7,430,514 | B1 | 9/2008 | Childress et al. |
| 7,451,094 | B2 | 11/2008 | Royall, Jr. et al. |
| 7,475,032 | B1 | 1/2009 | Patnode et al. |
| 7,603,331 | B2 | 10/2009 | Tuzhilin et al. |
| 7,752,326 | B2 | 7/2010 | Smit |
| 8,005,896 | B2 | 8/2011 | Cheah |
| 8,103,611 | B2 | 1/2012 | Tuzhilin et al. |
| 8,150,913 | B2 | 4/2012 | Cheah |
| 2001/0013009 | A1 | 8/2001 | Greening et al. |
| 2001/0032115 | A1 | 10/2001 | Goldstein |
| 2001/0042002 | A1 | 11/2001 | Koopersmith |
| 2001/0056374 | A1 * | 12/2001 | Joao .............................. 705/14 |
| 2002/0059379 | A1 | 5/2002 | Harvey et al. |
| 2002/0065894 | A1 | 5/2002 | Dalal et al. |
| 2003/0023489 | A1 | 1/2003 | McGuire et al. |
| 2003/0061215 | A1 | 3/2003 | Messina |
| 2003/0142664 | A1 | 7/2003 | Gerszberg et al. |
| 2004/0128624 | A1 * | 7/2004 | Arellano et al. .............. 715/530 |
| 2004/0133471 | A1 | 7/2004 | Pisaris-Henderson et al. |
| 2004/0215514 | A1 | 10/2004 | Quinlan et al. |
| 2004/0261127 | A1 | 12/2004 | Freeman et al. |
| 2005/0125354 | A1 | 6/2005 | Pisaris-Henderson et al. |
| 2006/0026067 | A1 | 2/2006 | Nicholas et al. |
| 2007/0073581 | A1 | 3/2007 | Kempe et al. |
| 2007/0093258 | A1 | 4/2007 | Steenstra et al. |
| 2007/0118420 | A1 | 5/2007 | Jung et al. |
| 2007/0130002 | A1 | 6/2007 | Moran et al. |
| 2007/0208610 | A1 | 9/2007 | Pisaris-Henderson et al. |
| 2007/0239537 | A1 | 10/2007 | Protheroe et al. |
| 2008/0033815 | A1 | 2/2008 | Choi |
| 2008/0033826 | A1 | 2/2008 | Maislos et al. |
| 2009/0012841 | A1 | 1/2009 | Saft et al. |
| 2009/0018918 | A1 | 1/2009 | Moneypenny et al. |
| 2009/0030774 | A1 | 1/2009 | Rothschild et al. |
| 2009/0030775 | A1 | 1/2009 | Vieri |
| 2009/0030972 | A1 | 1/2009 | Rogers |
| 2009/0043648 | A1 | 2/2009 | Mahdian et al. |
| 2009/0055249 | A1 | 2/2009 | Lieberman |
| 2009/0063283 | A1 | 3/2009 | Kusumoto et al. |
| 2009/0063284 | A1 | 3/2009 | Turpin et al. |
| 2009/0067599 | A1 | 3/2009 | Agarwal et al. |
| 2009/0076899 | A1 | 3/2009 | Gbodimowo |
| 2009/0076902 | A1 | 3/2009 | Grinsted et al. |
| 2011/0087693 | A1 * | 4/2011 | Boyce ........................... 707/769 |

FOREIGN PATENT DOCUMENTS

| | | |
|---|---|---|
| AU | 2003293160 | 11/2003 |
| JP | 2004533020 | 10/2004 |
| WO | WO 02/104005 | 12/2002 |
| WO | WO 03/058531 | 7/2003 |
| WO | WO 2004/021152 | 3/2004 |
| WO | WO 2004/051418 | 6/2004 |
| WO | WO 2005/043341 | 5/2005 |

OTHER PUBLICATIONS http://web.archive.org/web/19990125085655/http://facebook.com/.
http://web.archive.org/web/19990208013055/http://www.facebook.com/.
http://web.archive.org/web/19990825020910/http://facebook.com/index.html.
http://web.archive.org/web/20000414064120/http://facebook.com/index.html.
Encyclopedia of Library and Science, vol. 71, Allen Kent, p. 156 (2002).
http://en.wikipedia.org/wiki/Keyword_advertising.
http://news.cnet.com/Pay-for-replacement-gets-another-shot/2100-1023_3-208309.html.
http://sigchi.org/chi95/proceedings/papers/us_bdy.htm.
Cirit, et al., "Consumer Profiling Using Fuzzy Query and Social Network Techniques," 6 pages, 2005.
Klaas Kox, HAIT Master Thesis series nr. 08-005, "Mobile Contextual Advertising," Tilburg University, Tilburg, The Netherlands, Dec. 2008, 28 pages.
http://www.google.com/press/pressrel/pressrelease39.html, Google Launches Self-Service Advertising Program, Oct. 23, 2000.
Upendra Shardanand and Pattie Maes, MIT Media-Lab, "Social Information Filtering: Algorithms for Automating 'Word of Mouth,'" May 7-11 1995, CHI '95 Mosaic of Creativity, pp. 210-217.
http://m.wired.com/magazine/2010/07/ff_caterina_fake/ Devin Leonard, What You Want: Flickr Creator Spins Addictive New Web Service, Jul. 28, 2010, pp. 1-5.

* cited by examiner

Example Search Screen Flow - USER side of the system

A. SIGN IN and SEARCH or JOIN option prompt

B. USER SIMILARITY PROMPT

C. SCOPE OF DATABASE PROMPT

D. JOIN SOLICITATION and initial preference question prompt to user

E. TRAIT OPTION SCREEN defining micro-demographic to search

F. VARIABLE TRAIT selection screen, narrowing variable based target demo group

G. FACTOID advertisement deemed relevant to USER based on data collected to this point H. PREFERENCE MENU SCREEN wherein user selects personal preference and personal issue areas of interest related to their micro-demographic.

I. FACTOID advertisement selectively relevant to the indicated preference areas and the users' indicated micro-demographic.

J. RESULTS SCREEN related to data correlation of preferences regarding the users' micro-demographic group and the areas of interest selected in prefereneces menu. Option of selecting a result to further correlate that result to the users' micro-demographic group.

K. TOP TEN, or selected amount of closest correlating members to the users' micro-demographic parameters, who selected a preference aspect.

L. SELECTED DATABASE MEMBER deemed of interest by the user, likely based on photo featured and/or selected data featured in the "top 10" database members screen provided. This member's areas of personal preference and personal feedback collected are featured for the user to select, toward reviewing long form and provided options feedback from the member in this area M. LONG FORM FEEDBACK is provided related to a selected area of personal preference.

N. OPTIONS of cross referencing this new area of preference with the users' micro-demographic as a whole and other database option such as the review of other preference data of members selectively similar to a selected single member, changing the micro-demographic completely to be relevant to the traits of another member, are given.

O. OPTIONS to return to preference screen and other phases of the search to begin with new preference areas, or a new micro-demographic should a return to the TRAIT screen be selected.

FIG.1

Example JOIN Data-Input Screen Flow - MEMBER side of the system

A. TRAITS OF MEMBER MENU and feedback screen

B. PREFERENCES OF MEMBER MENU and feedback screen and sub-screens for longer form feedback C. SUMISSION OF PHOTO and/or other visual or audio data for posting within the member's searchable profile within database D. MEMBERS' incentive point accrual total E. MEMBERS' example redemption option prompt screen F. MEMBERS' full redemption catalog G. MEMBERS' incoming e-mail from USERS, wherein responding to such mail provides additional incentive points to the member.

H. ADVERTISING posting agreeably received by point accruing members, example

I. POSTING BOARD uniquely assembled for MEMBER based on trait and preference data collected regarding the member

FIG.2

POP UP SCREEN :

I would like to focus my search to the following:

- ☐ ALL MEMBERS IN THE DATABASE
- ☒ TOP 10 CLOSEST MATCHES TO MY DEMO
- ☐ TOP 50 CLOSEST MATCHES
- ☐ TOP 100 CLOSEST MATCHES
- ☐ TOP 5% CLOSEST TO MY DEMO
- ☐ TOP 10% CLOSEST TO MY DEMO
- ☐ TOP 15% CLOSEST TO MY DEMO

☐ Include only members who gave long form feedback on answers

■ Include only members with photos or video

MUSIC ITEMS AVAILABLE-click item to order with points and/or cash
(Pay $5 per 10 points extra)

- ☐ CD singles 150 points
- ☐ full Cd's 500 points
- ☐ DOWNLOAD singles 50 points
- ☐ VIP passes at concerts 200 pts
- ☐ AUTOGRAPHED items 500 pts
- ☐ etc, etc.

FIG.8

SCREEN 7

| PHOTO | JOE 1 | | PHOTO | PETE 7 |
| PHOTO | JIM 2 | | PHOTO | DAVID 8 |
| PHOTO | KELLY 3 | | PHOTO | WHIT 9 |
| PHOTO | BILL 4 | | PHOTO | PARKER 10 |
| PHOTO | TONY 5 |
| PHOTO | RICH 6 |

These are the top ten closest matches to your selected group who chose IN SYNCH as their favorite group. Click to find out other info on these members

SEARCHER SELECTION, BASED ON PHOTO, IS PETE.

POP UP SCREEN:

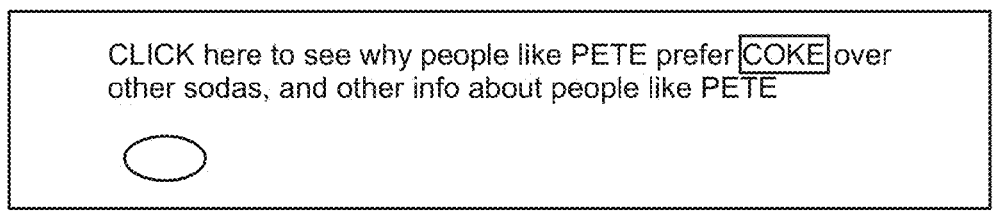

CLICK here to see why people like PETE prefer COKE over other sodas, and other info about people like PETE

Fig.12

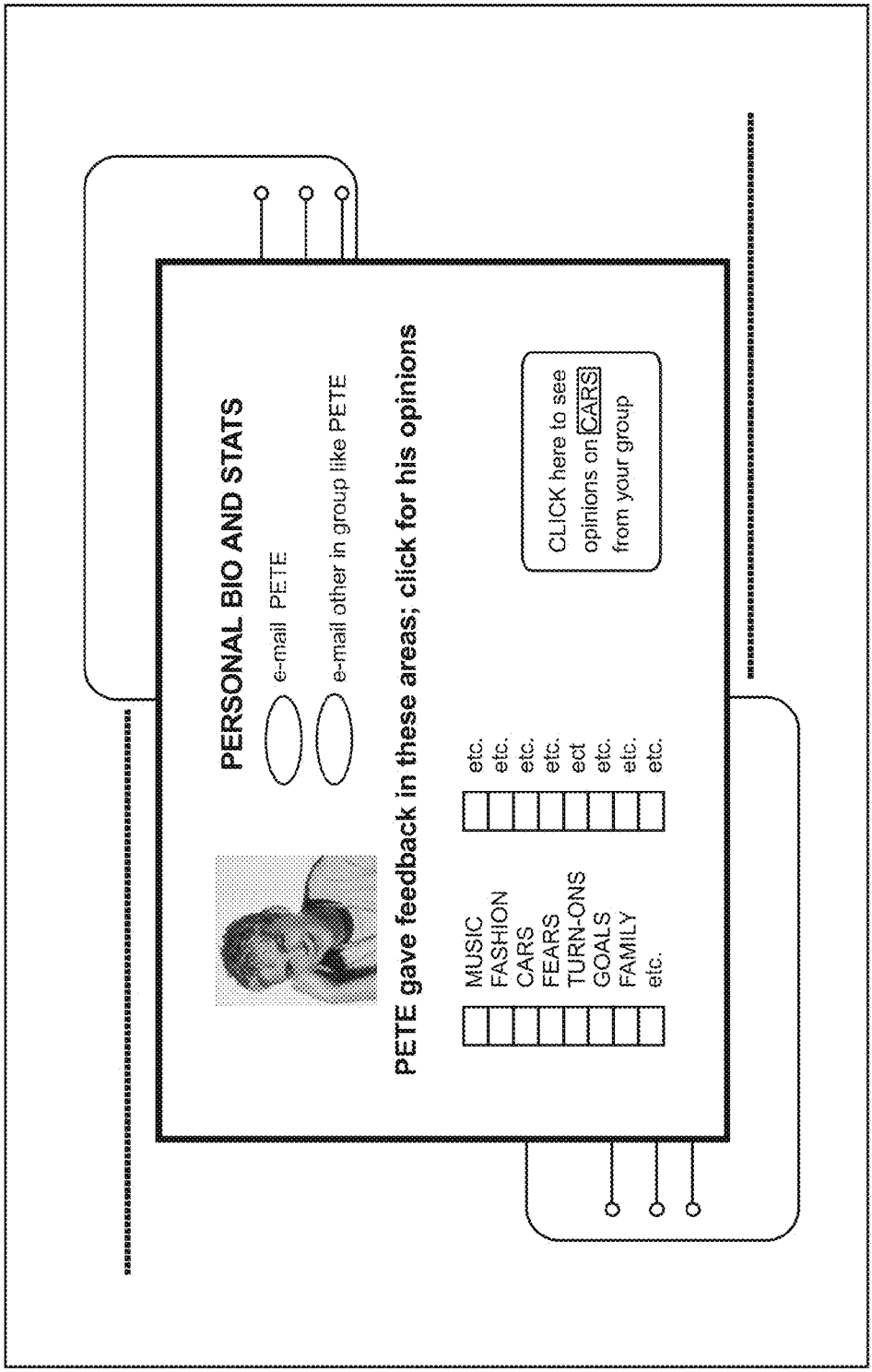

The searcher has selected group's CARS preferences

SBP proprietary-confidential

| SEARCHER'S category importance ranking | SEARCHER'S selected trait categories | RESPONSE | RANKING | | A MEMBER'S responses exemplary of a respondent with SEARCHER's uniquely defined demographic | | RANKING |
|---|---|---|---|---|---|---|---|
| | SEX | M | | | SEX | M | |
| Definitive | SEXUAL PREFERENCE | GAY | | | SEXUAL PREFERENCE | GAY | |
| Definitive | RACE | Asian | | | RACE | Asian | |
| Definitive | WEIGHT | 150-175 | | | WEIGHT | 160 | |
| C | DEMEANOR (aggressive/passive) | Aggressive | 3 | | DEMEANOR (aggressive/passive) | Aggressive | 3 |
| B | INCOME | 100,000-125,000 | 5 | | INCOME | 80,000 | 5 |
| A | | | 4 | | CONTROL FREAK LEVEL | | 3 |
| | | | | | HEIGHT | | |
| | | | | | BODY TYPE | | |
| | | | | | CONTENTMENT LEVEL | | |
| TOTAL RANKING | | | 12 | | | | 11 |

A= double ranking
B= neutral, no change
C= half ranking
Definitive= SEARCHER has requested definitive exclusion of members not matching response

NAME?

Example trait variable pull-down screens:
Definitive category: Variable category:
Sex Pref:  STRAIGHT        DEMEANOR:
           BI-SEXUAL                    AGGRESSIVE   5
           GAY                                       4
           OTHER                        NEUTRAL      3
                                                    2
                                        PASSIVE     1

In the above scenario, the MEMBER is within a range of 2 the member's ranking results, based on the number of respondents with photos available that the SEARCHER has requested. 10 in this case, a range of plus or minus "3" in the total trait ranking response would have allowed that MEMBER to be included in the demographic.

Note, the difference between the "income" category is doubled, in this scenario, to demonstrate the importance ranking provided by the SEARCHER, of "A"

FIG. 17

METHOD AND SYSTEM FOR COMPILING A CONSUMER-BASED ELECTRONIC DATABASE, SEARCHABLE ACCORDING TO INDIVIDUAL INTERNET USER-DEFINED MICRO-DEMOGRAPHICS

RELATED APPLICATIONS

The present application is a continuation of prior U.S. patent application Ser. No. 09/808,538, filed Mar. 14, 2001, which is a continuation-in-part of U.S. patent application Ser. No. 09/756,581, filed Jan. 8, 2001, now abandoned, which is based on and claims priority to U.S. Provisional Patent Application Ser. Nos. 60/175,093, filed Jan. 7, 2000, 60/176,440, filed Jan. 14, 2000, 60/189,060, filed Mar. 14, 2000, 60/212,663, filed Jun. 20, 2000, and 60/226,672, filed Aug. 22, 2000, the entire contents of all of which are hereby incorporated by reference.

BACKGROUND OF THE INVENTION

1. Field of the Invention

The present invention relates to a system and method for referencing consumer preference data and merchandise and service "popularity" according to human physical and emotional characteristics, traits and personal preferences. In essence an animate, or "HUMAN" cataloging and method/system for researching and locating purchasable items and preference data, rather than an inanimate one. This system and method would preferably be Internet based, presented as a special Internet address and destination, comprising a "search engine," or searching means based on "searcher" or Internet user supplied human trait and preference data parameters.

2. Description of the Related Art

Current "e commerce" or computer based electronically transacted business options, and related inventions thereof, are limited in scope typically with regard to the indexing and cataloging of merchandise and services. Further, "search engines" familiar to Internet users, are limited often to search results based on correlation between words or phrases submitted by the user, relative to those assigned to Internet accessible sites and data banks.

In a society of individuals who make many decisions based on dynamics of personal competition and success, and interpersonal comparison, the need for a searching means to reference information based on traits and preferences of other individuals, and groups of individuals, would clearly be valuable and of interest to many. The most compelling lure of entertainment and advertising, is information about other individuals that might be considered "private" or personal, whether they be celebrities or not. Television programs and advertising that is "revealing," especially those focused to the negative feelings and occurrences of others, are remarkably successful: "Rubber-necking" on a highway also demonstrates the public's often macabre fascination with the plight or misfortune of others. The same can be said with the public's fascination with the success of others, mostly relative to their own circumstances and personal esteem.

The means to search personal preference and "feelings" data of actual individuals, would allow the Internet user new options in discovering the behavioral and purchasing preferences of individuals similar to themselves, or similar to a person or "type" of person relevant to the user: Those of romantic interest to an internet user/searcher, and those who the Internet user may be competitive with, are two examples of searching parameter bases that may be relevant to a particular individual searching via such newly available means.

Further, peripheral areas of interest may be discovered by users as they discover selected personal data about their designated "types" of people-leading Internet searchers to revelations steered by the options displayed by such a system and searching means.

For Internet advertising, the relevance of being able to target user determined and defined micro-demographics is invaluable. A searcher who has defined their own dynamics demographically, in order to accomplish their search, could receive selected advertisements in editorially prepared formats, to maintain the highest degree of personal relevance and potential interest, unlike the generally poorly focused myriad of solicitations broadcast to millions of Internet users and mail box holders.

To date, all demographic specific devises on the Internet are geared to "sampling" and looking at the Internet users from the data-seekers' vantage point. The present invention addresses the interest and need of the Internet user to personally discover discreet demographic preference and behavioral data relative to their own personal objectives and interests: An active demographic specific vehicle from the consumers' point of view, instead of a passive one where their activity and data is sampled and they are categorized and solicited according to the interpretation and interests of unseen others—typically larger Internet based firms and advertisers.

SUMMARY OF THE INVENTION

The present invention relates to a system and method for referencing consumer preference data and merchandise and service "popularity" according to human physical and emotional characteristics, traits and personal preferences. In essence an animate, or "HUMAN" cataloging and method/system for researching and locating purchasable items and preference data, rather than an inanimate one. This system and method would preferably be Internet based, presented as a special Internet address and destination, comprising a "search engine," or searching means based on "searcher" or Internet user supplied human trait and preference data parameters.

The present invention provides options for "users" or "searchers," (those using the database,) to reference and compare other personal traits and feedback from "members" (those having supplied the core data to the database,) allowing the database to serve as a source of information for decision-making and correlation related to matters beyond the purchase of products and services: In essence, a "people" based Internet SEARCH ENGINE rather than a "things," brand category or typical word-correlating search engine.

In placing the control in the hands of the Internet searcher, the intrigue and interest in the options provided by the search engine grows. The very demographic specific information that advertisers seek, is the same sort of information that individuals wish to know about each other.

Further, the present invention in providing such discreet targeting research means for Internet users, Internet advertisers are reciprocally empowered with new consumer targeting means, based on remarkably discreet demographic groupings based on consumer determined parameters. In building such a special database and search engine, advertisers are further advantaged editorially, as database information relevant to their brand or industry can form the basis of "search relevant" factoids, which are in fact paid flash advertisements relayed when the factoid information is deemed relevant to the searchers' information quest.

Accordingly, a system and method for accessing actual human personal preference and opinion data, whose unique demographic parameters are defined by an individual Internet user is provided. The system includes a computer linked to a specialized database which allows individual Internet users to supply and access human personal preference data according to trait and preference variable data input to the system.

The system contains a data correlating program which provides data sorting parameters that are defined by selected degrees of human trait and preference variables. Further, data pertaining to any one of these trait and preference variables may be assigned special program value, should special importance of the selected data be indicated by those who access the database. Variables not provided by the system to the Internet user are preferably provided by the user as keyed-in, or otherwise subjectively supplied data that may be included in data correlation and reports for that user. Users, or those accessing the database for customized data results from the overall database, may, in turn, supply information to the database, or build a data profile, should they indicate that the data they seek pertains to individuals similar to themselves. The data they seek and supply pertains to their personal traits and personal preferences, including feelings, opinions, issues and purchasing or commercial preferences.

With the system and method of the present invention, users may refine their demographic of choice within a search, by way of system provided options deemed to be standard options provided to users at selected points within a search. Users may also refine their search by re-entering the demographic related trait and preference data, preferably by re-accessing Internet site screens already accessed within the same search, for input of revised demographic parameter data.

Further, the present system and method allows advertisers to target their information (products and services) with extreme specificity to users, as the users themselves are defining the areas of demographic interest. Advertisements may occur as editorial comments with Internet links, pertinent to data in the database specific to a products' or services' sampling results. These "factoids" may be calculated and relayed specifically to a single user who has met subjective system user relevance criteria to receive selected advertising data results. Further, focus group data, or consumer preference sampling may be accomplished with immediacy and unrivaled relevance, as only users and members of selected relevance to the data solicitation might be contacted. In other words, discreet trait and preference specific groups of individuals that would be virtually impossible to locate and sample with typical focus group approaches are able to be located by the present system and method.

Some important aspects and benefits of the present invention, include that it provides:

A unique database of value to consumers, advertisers, brands and other organizations seeking extremely discreet and quick, specific and accurate consumer preference feedback.

A database which can be referenced with a virtually infinite number of demographic options, from broad to remarkably specific, with a large range of preference responses becoming available. And, with the preferable ability to modify micro-demographics being sampled based on user revisions of the search based on selected preferences and opinions.

A searching innovation for consumers which will attract new Internet users to any "parent site" preferably housing databases based on the present invention.

The ability to cross-market, co-venture and/or couple with other brand's sites, other e-commerce sites and other internet properties in general, linking to and from by virtue of the unique revelations and options that the invention creates for both consumers and businesses.

New means for people to connect with the specific types of people that can assist or benefit them in their unique, personal and professional circumstances.

Revenue potential of Internet based resources involving the technology of the present invention would likely be derived from options including:

LINKING from featured brands to brand sites or purchasing options.

FEES for brand inclusions in pull-down screen options (pull down screens provide "options.")

ADVERTISING: Banners and "factoids" for brands when certain areas of interest are explored (pop-up promos and information related to the selected traits and/or preference data.)

SALE OF SPECIFICALLY SOLICITED data, requested by clients via standard member data solicitation screens, or specific short-term "pop up" data prompt screens/menus.

Attraction of new users to a parent site and that site's services

The direct sale of selected items or revenue from linked sales or referrals.

SALE OF DATA that is more comprehensive and not searchable on the site by members.

FEES charged for relaying names of SEARCHERS and/or MEMBERS who agree to have literature of mail forwarded from selected brands, or brands within selected categories.

FEES to members to use the service and to email each other and receive other site services reserved for members, potentially offset by meeting data-supplying or site usage thresholds.

FEES to brands to be "multi-listed" or programmed to appear when a MEMBER or SEARCHER references "suggestion" screens which may list brands to consider in supplying accurate preference data.

ADVERTISERS can send ad messages within the CLOSED email system with remarkable specificity, reaching their "dream" demographics and audience, with the same ease and focus that MEMBERS do, with their own personal messages.

BRIEF DESCRIPTION OF THE DRAWINGS

For the purpose of illustrating the invention, there are shown in the drawings several forms which are presently preferred, it being understood, however, that the invention is not limited to the precise arrangements and instrumentalities shown.

FIG. 1 is a block diagram illustrating the preferred sequence of interactive prompts, or Internet screens, presented to an Internet "searcher" or user, accessing the database of the present invention in search of specific preference and opinion data.

FIG. 2 is a block diagram illustrating the preferred sequence of interactive prompts encountered by an Internet user who might be supplying data to the database of the present invention, resulting in a specific data profile of that individual, in exchange for incentives.

FIGS. 3 through 16 illustrate the preferred interactive, Internet screens encountered during a search utilizing the present system and method.

FIG. 3 illustrates a preferred "sign in screen" related to an interacting Internet site based on the present invention.

FIG. 4 illustrates a preferred Internet screen that would prompt a user to identify if data being sought might be related to themselves, allowing for the building of a profile of the searcher, based on the searcher's own search parameters and interaction.

FIG. 5 illustrates a preferred solicitation for data from a user searching the database, to sample the searchers toward completing database relevant profiles of them, perhaps in exchange for the useful data supplied to them during their search.

FIG. 6 illustrates a preferred Internet screen prompting a user to provide trait-related data defining the demographic, or micro-demographic group of interest to that user for the search. The screen further prompts the user, selectively, to assign A, B or C importance to the traits they select, C being the highest degree of importance in this scenario.

FIG. 7 illustrates a secondary Internet screen prompt, requesting more discreet data from a user for the searching parameters with regards to a selected demographic defining trait, in this instance, "demeanor." FIG. 7 further illustrates a FACTOID advertisement, or flash advertisement provided in a database and user search relevant format to maintain the highest degree of relevance for the user. Linking means are also provided in this example, to the site of the advertiser who has been featured in this FACTOID deemed relevant enough to present to this Internet user, based on their feedback through the system to this point.

FIG. 8 demonstrates interactive variables that may be provided to users in further defining the demographic, or micro-demographic of relevance to their searching needs. In this scenario, options including narrowing the sample group based on the user supplied trait variable parameters based on a selected number of database profiles (or people,) or a selected percentage of the total database deemed by system parameters to be most similar to the user-defined micro-demographic. Further, the option to further narrow the sampling based on secondary variables, such as those database profiles that include photos or visual data, is demonstrated. FIG. 8 further demonstrates a menu for selecting items available for redemption with points accrued from an incentive program designed to solicit data in to the database from users, in exchange for redeemable points, or the like. This demonstrates the promotion of the data accrual needs of the database, to grow and evolve it in to a more discreet and comprehensive Internet user and advertiser resource.

FIG. 9 illustrates a preferred interactive Internet screen that would allow users to define the areas of opinion and/or preference information personally relevant to that user pertaining to the demographic group that user has already defined by providing trait and/or other demographic defining parameters. FIG. 9 further demonstrates the continual options provided to users, such as redefining their demographic of interest, sending mail to their uniquely defined demographic among other Interactive options to maintain the user as the one controlling both the search parameters and the direction of the searching process. In FIG. 9, the user has selected "music" as an area of preference data interest.

FIG. 10 illustrates a FACTOID presented by the system to this particular user, based on a system determination that the user supplied data to this point in the search warranted this particular data FACTOID featuring this particular advertiser and link, to be relayed to this user. This FACTOID further demonstrates the preferred format and level of trivia and user-relevant interest that these unique advertising vehicles, tied to information from the database, may provide.

FIG. 12 illustrates a scenario wherein the top ten database members, or individual with both profiles and photo data within the database, are displayed. "Top ten" being defined by members meeting trait and preference criteria supplied by the user in their search. FIG. 12 further illustrates a FACTOID advertisement that appears when the user selects a member from the ten, who has a profile that allows selectively relevant database information to be featured that is relevant to the user now, because the user has shown interest in a specific database member, or profile, wherein the particular preference featured in the factoid is an aspect of that member's feedback and profile. The further option of reviewing information related to an entirely new demographic sampling, in this instance "people like Pete," opens the option of selectively relevant data being relayed to the user having the impact of redefining the areas of search and preference curiosity for the user.

FIG. 13 illustrates a detailing of opinion and preference data the individual member, or selected profile, contains. On selecting a new area of preference interest, "cars," prompted from the list of available data related to the selected member profile, in this scenario the user receives the option of reviewing data from the users ORIGINALLY defined demographic group in relation to the NEWLY selected preference/opinion venue.

FIG. 14 details subsequent, more detailed "long form," or keyed-in feedback within an individual database member profile that a user may access. FIG. 14 further demonstrates a user selecting the system supplied prompt of reviewing the selected preference in relation to the originally defined demographic. This aspect is an illustration of the preferred effect of user pro-activity and advertiser friendly system prompts to users, creating an illusion of control for users over a search that is steered by the system toward areas of revenue for the system and applications of the present invention, however subtle and covert to not destroy the editorial integrity of the search relevance to a user.

FIG. 15 illustrates selected results in the selected preference area, "cars," related to the user's originally defined demographic group of interest. Linking means to selected advertisers who appear within the overall list of preference results is demonstrated as well, providing added value to those brands over those who were listed but were not advertisers, for example.

FIG. 16 details further system supplied prompted options for a user to refine their demographic of interest, and feedback venues or preference areas related to the groups selected and correlated. These options further demonstrate a balance between "editorial" and "advertising," as options are provided to expand the proactive searching means for the user, though the options provided may serve discreet and specific areas of interest for the system to "guide" a user, or users, for revenue purposes.

FIG. 17 demonstrates a simple correlation between and user's trait-based searching parameters in defining a demographic, and the applicable data within a member's profile, in determining relevance of this particular member to the search.

DETAILED DESCRIPTION OF EMBODIMENTS OF THE INVENTION

Please note that in the foregoing description, the term "database", when described as performing a function or correlation, includes computing means which manage the database. The computing means includes a database and a database management system which receives, sorts, compiles and stores the individual personal trait and preference data in the database into searchable records.

The system and method of the present invention provides the individual Internet user and searcher, ("user") the option of entering or identifying variables, including human traits, and other variables/aspects familiar to the "human condition," in searching for information of personal relevance. For instance, an Internet "shopper" might have curiosity about particular preferences or shopping data of other "single women, gay, 18 to 24 years of age, "active" in demeanor, who is a DEMOCRAT politically, earning over $100,000 per year and who has a very "optimistic" outlook or attitude." This inquiry would be entered by way of a series of keyed in or "site provided" variable options (for example, by a pull-down menu such as that shown in FIG. 6), selectively input by the shopper or user and then referenced against the available database of "MEMBERS," or people who have willingly and directly supplied personal preference data and screen names to the database in exchange for incentives, or in exchange for data they sought from the system (FIG. 2).

Figure 3:
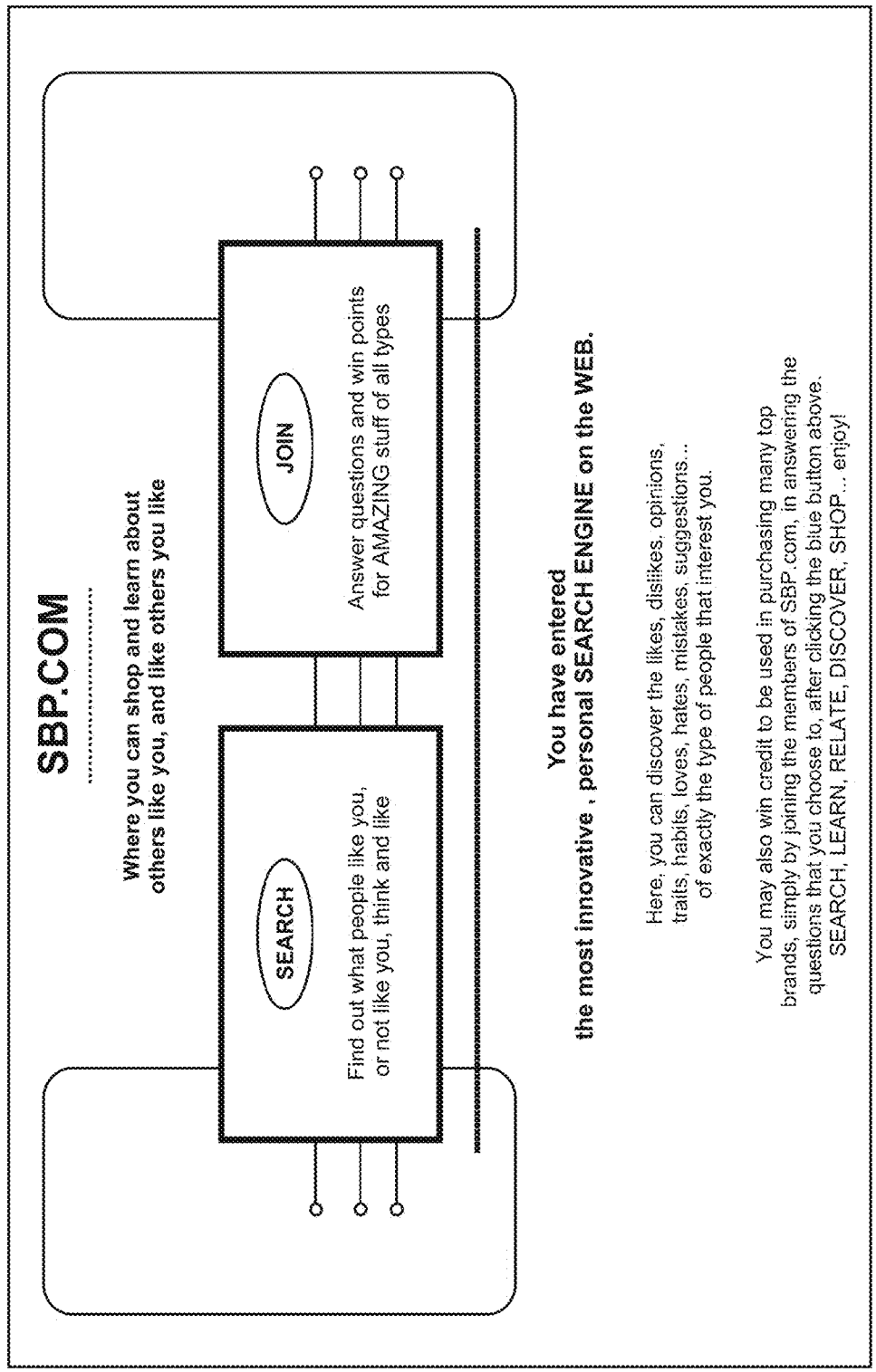

The intent of the Internet visitor may be determined when initiating interaction with sites based on the present invention (FIG. 3). On "signing in," those searching for data, and those strictly supplying a data profile to the database for direct incentives, may be discerned.

Variable options not provided to the user pre-set, as in via "pull down screens," could selectively be keyed-in by the user for selective inclusion in the "search" should this keyed-in, or otherwise supplied data variable be understood and usable by the database searching and correlation means. This "manually input" word or phrase recognition option would allow for ever-more discreet searches, allowing for correlation and similarity with members within the database to become very specific. Perhaps more importantly, when those users who are searching the database for personally relevant, human interest information about a specific type of person (though they may not be using the database to shop or purchase), may be presented during the search with a myriad of advertising and purchasing options relevant to that user's search and demographic(s) of interest, thereby providing commercial value to those SEARCHERS/database-users who are not directly "shopping".

Figure 16:
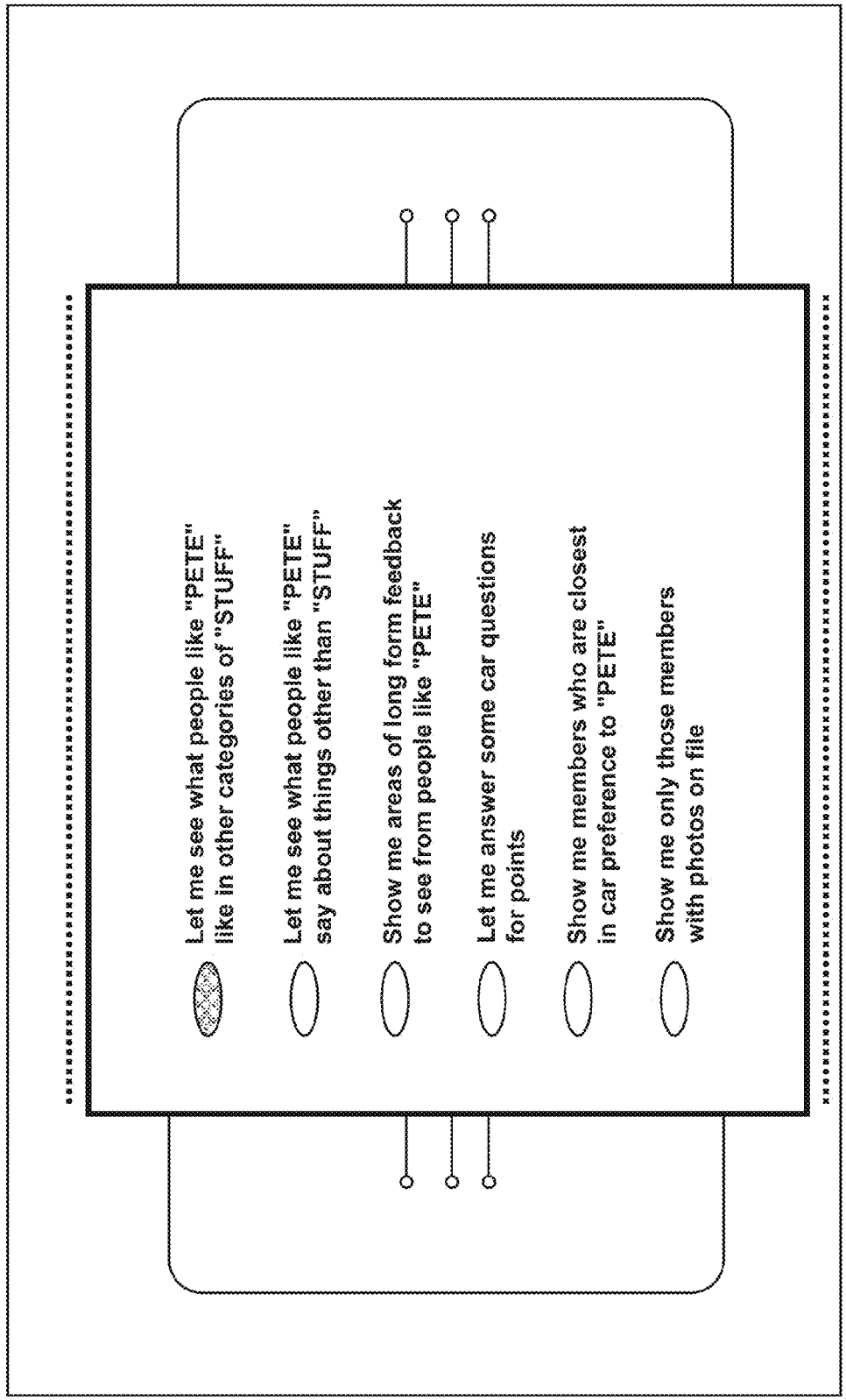

Users may refine their demographic of choice within a search, by way of system provided options deemed to be standard options to provide to users at selected points within a search (FIG. 16.) Users may also refine their search by re-entering the demographic related trait and preference data, (FIG. 6,) preferably by re-accessing Internet site screens already accessed within the same search, for input of revised demographic parameter data.

Figure 6:
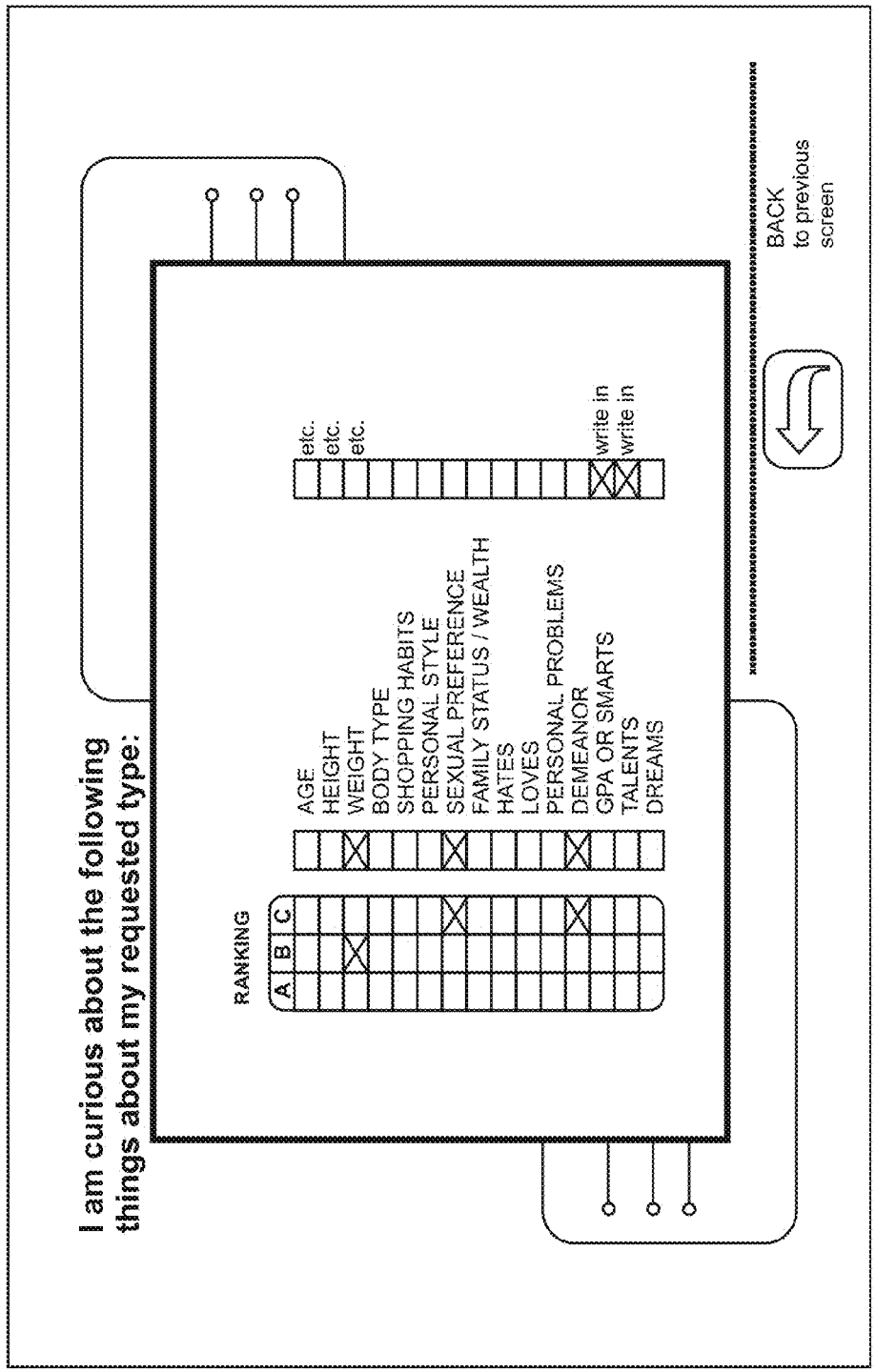

A computer and program (FIG. 17) capable of correlating values of trait and preference parameters would accommodate selectively frequent revisions of the selected group of database members relevant to a user at any particular point of their search: Revelations about selected opinions or preferences might lead a user to revise a search based on new interest in individuals who share that preference or aspect, (FIG. 12.) The database members included within a demographic may also be affected by other user-selected options, such as those affecting the scope of the group sampled, (FIG. 8.) Values assigned to the provided trait options used to "define" the initial demographic whose preferences are of interest to a user, might be affected by a variable degree of importance as selected trait might have to a user (FIG. 6.) For example, if weight is a critical aspect of the sampling, the user might select the highest importance option from several provided, giving this data more weight in the computer correlation of this variable in selecting a sampling from the database to analyze and relay to this particular user, as Internet transmitted data. A multitude of variables that a user might selectively include in a search, would mean that correlating means would include predetermined, subjective thresholds of correlation relevance for "members," (those who have data profiles within the database,) to be included in any sampling relayed to a user that reflects a group determined to be selectively similar to the user's demographic request. These predeterminations would be made by those who construct any application of the present invention, for instance, a group that might employ the present system or method in creating a TEEN Internet site, which allows young people to search data of teens based on combinations of traits defining a range of teens deemed to be of special interest to the user.

Figure 5:
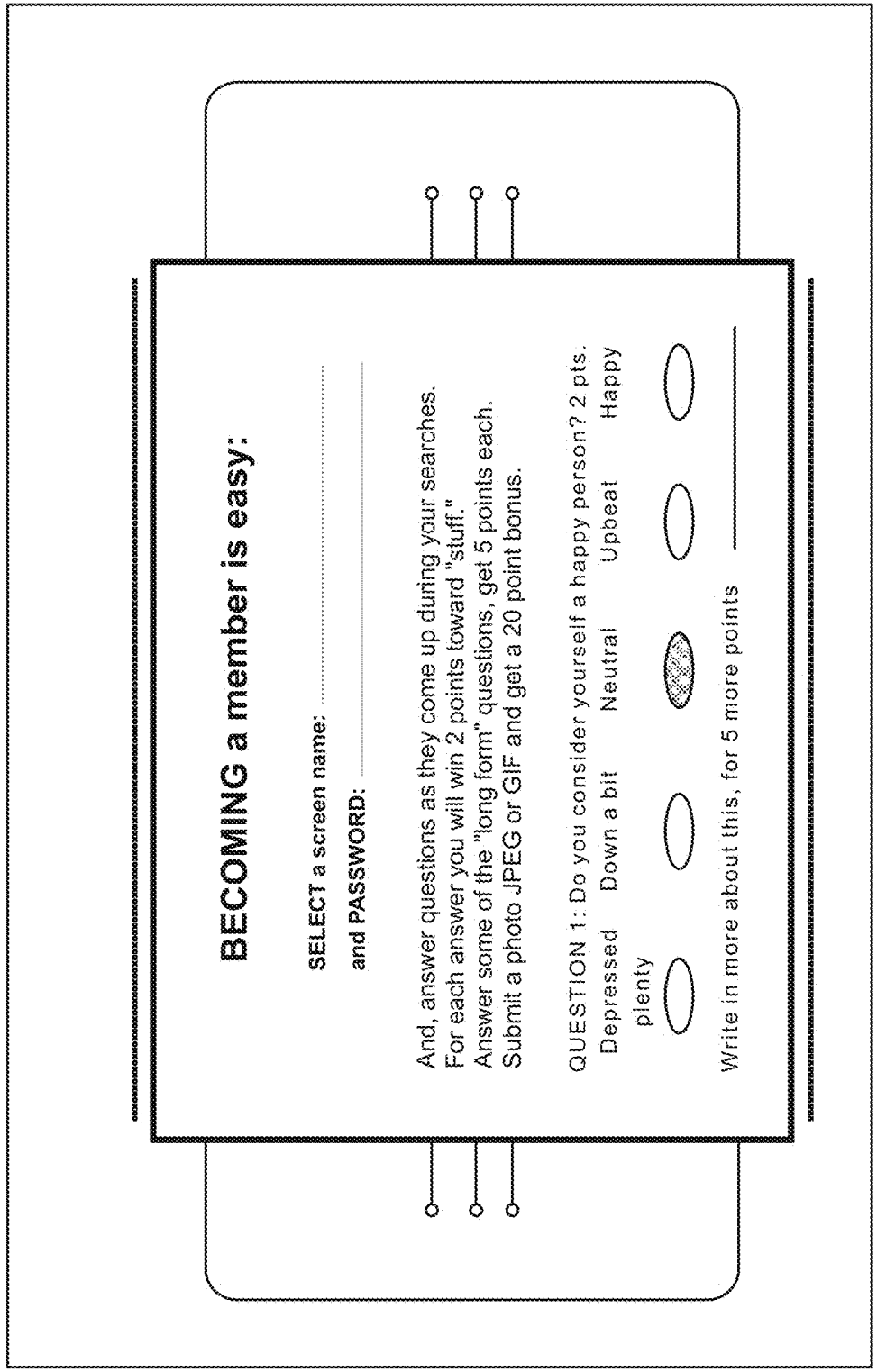

Incentives could clearly be provided to members (FIG. 2) to encourage the growth of the core database, such as direct rewards in cash or gifts, or the potential of incentive options. Incentives could be made available specifically to the user as well for "offering back" preference data, (FIG. 8) to be incorporated in to the database of the site related to the present invention—growing the database as it is used. Rewards need not be limited to these aspects though. In collecting specific personal, trait, preference and merchandise data from selected users, ever more data cataloged and recallable by users according to the traits of people and not things, may be compiled. Preferably, every user might become a member, and could be encouraged to do so (FIG. 5.)

Figure 7:
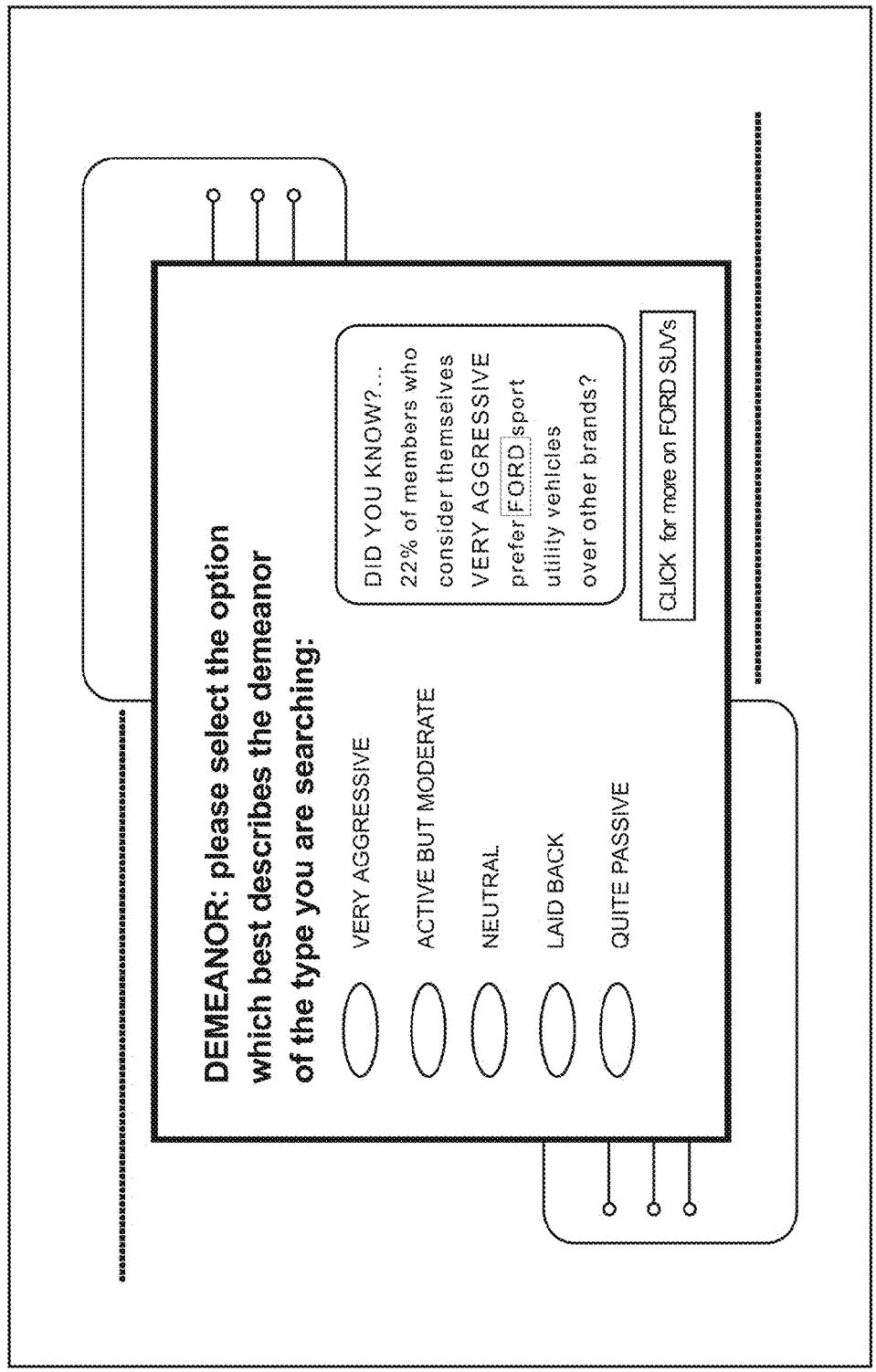
Figure 10:
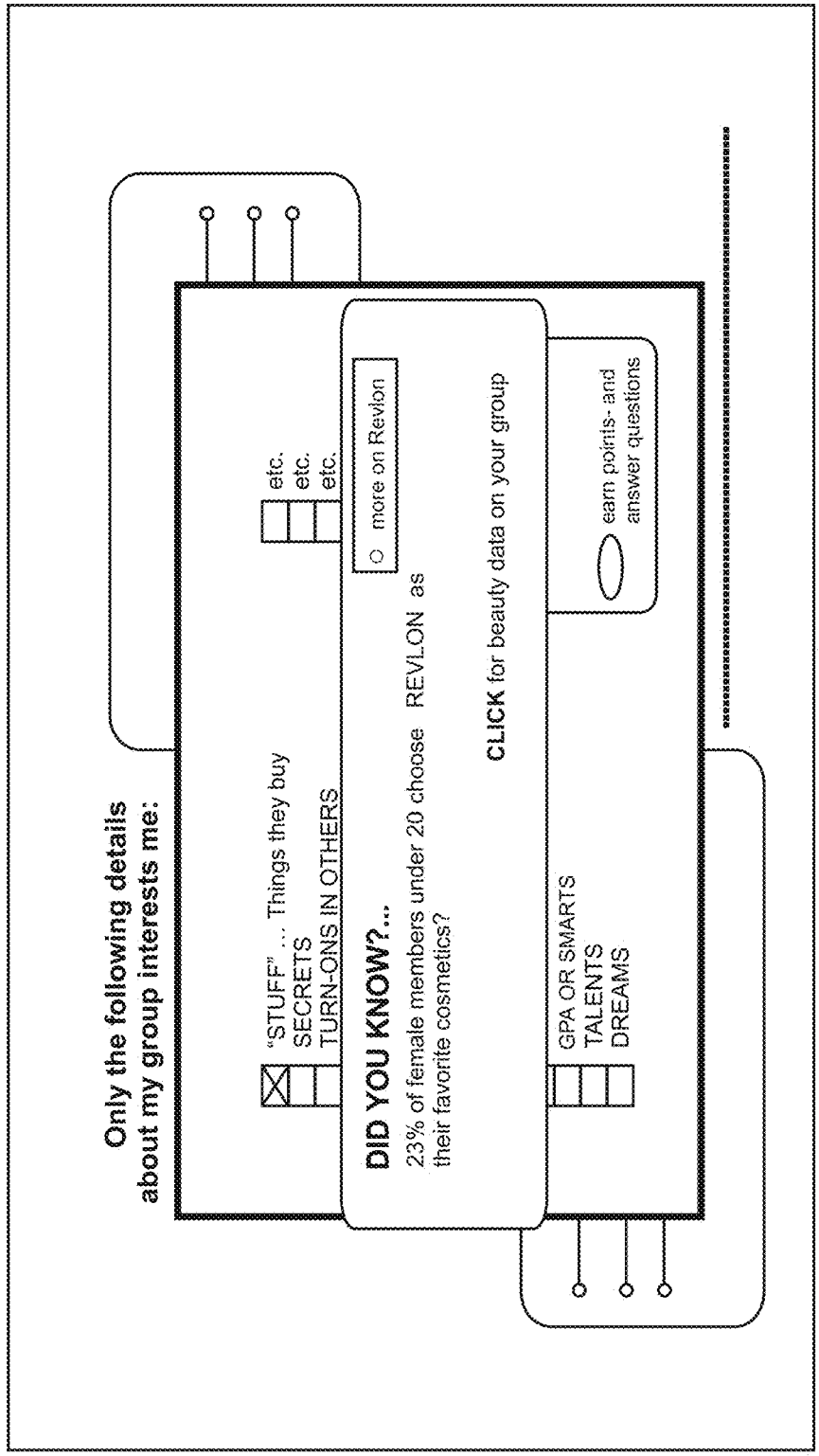

Objectives of the present invention are to provide new, discreet personal comparison means, and to provide new sources of purchasing/consumer information, by providing a forum for users to "relate" and identify with other specific types of people and consumers. Commercially, the present invention provides a "personal shopper" which is preferably unique to every user, as the personal shopper is a single, unique member of the site, or site-presented conglomeration of members fitting profiles deemed related to a user's data input and search parameters. Further, advertising may be targeted with relevance to both users/searchers, and advertisers (FIGS. 7 and 10.)

Figure 4:
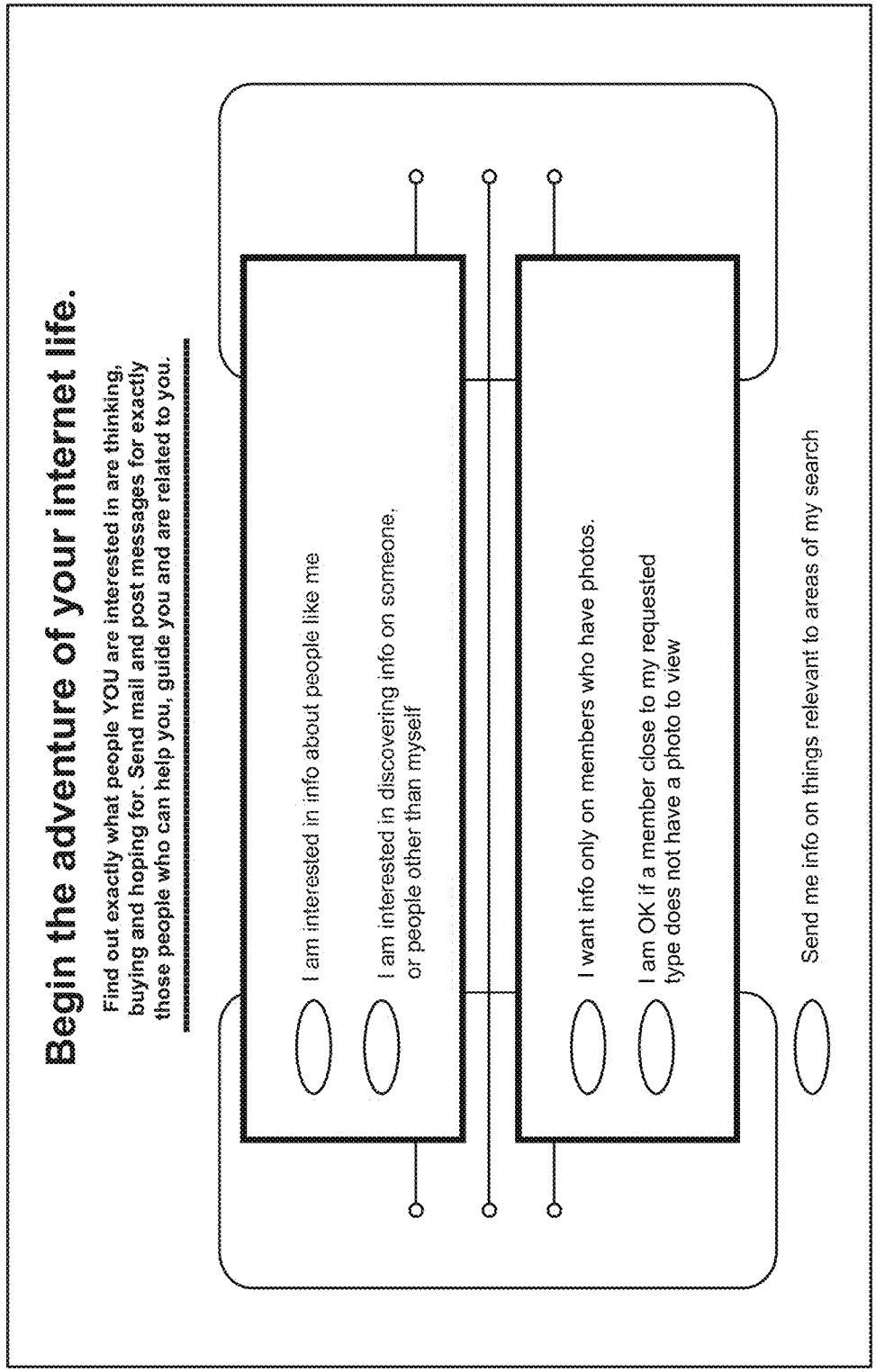
Figure 14:
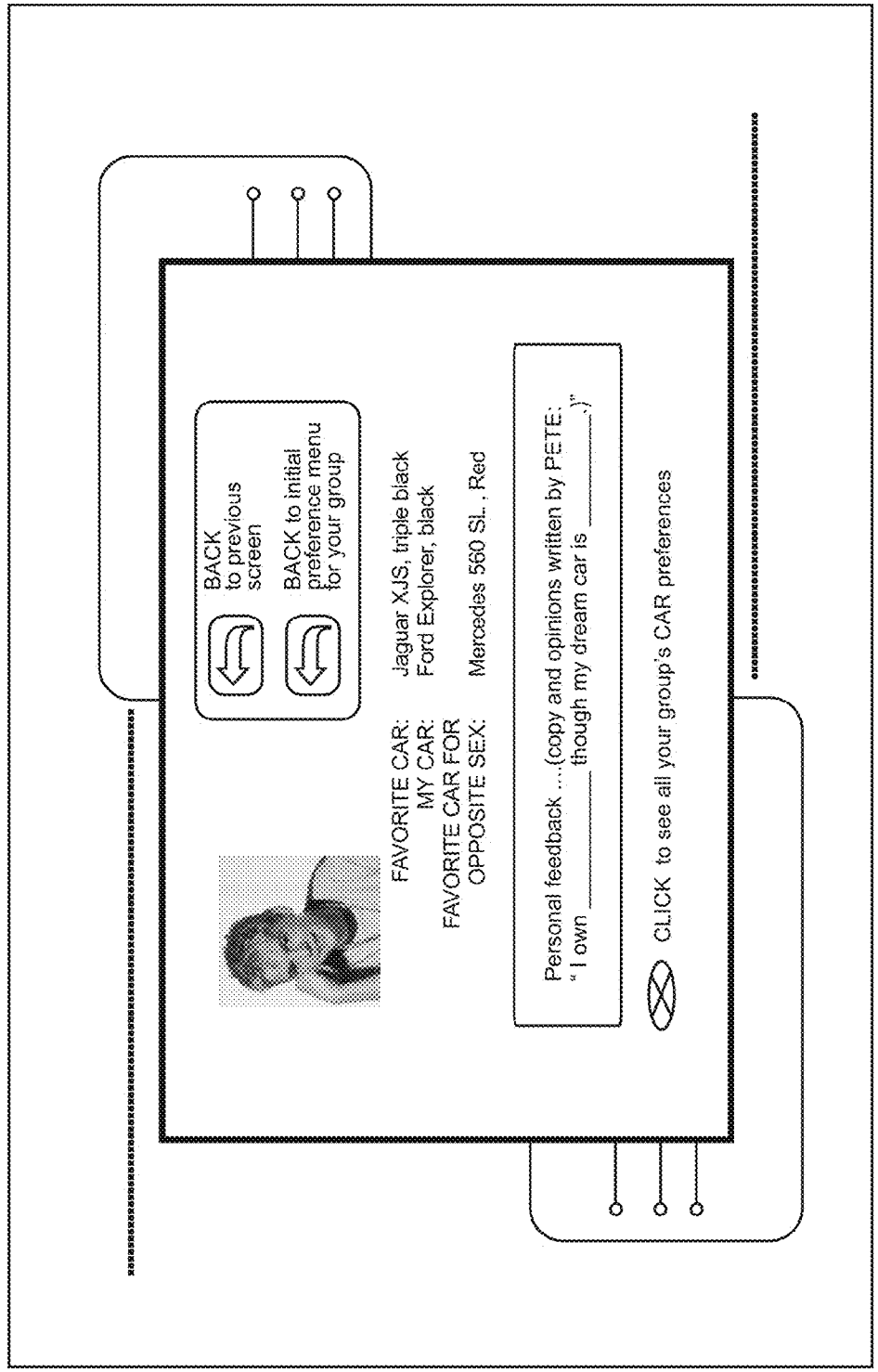

In being able to reference human trait and personality variables, people who the user/shopper may want to emulate, or not emulate, may be referenced for instance; people similar to the user may also be sampled, allowing individuals to compare learn and compare to those who may share their circumstances (FIG. 4.) This allows for unique learning about the things, places and purchasable items they have, would want and prefer. Further, searching for understanding of individuals whose preferences may be foreign to the user, such as a young woman searching for a gift for an older man, is facilitated by the present invention. Further, important personal decisions may become better informed by the "pull down screen" and long form (written) feedback (FIG. 14) from people who best relate to a user's circumstances, issues and "type" of person designated, from the overall database "membership."

Advertisers may target their information with extreme specificity to users, as the users themselves are defining the areas of demographic interest. Advertisements may occur as editorial comments, pertinent to data in the database specific to a products' or services' sampling results. These "factoids" may be calculated and relayed specifically to a single user who has met subjective system user relevance criteria to receive selected advertising data results.

Figure 11A:
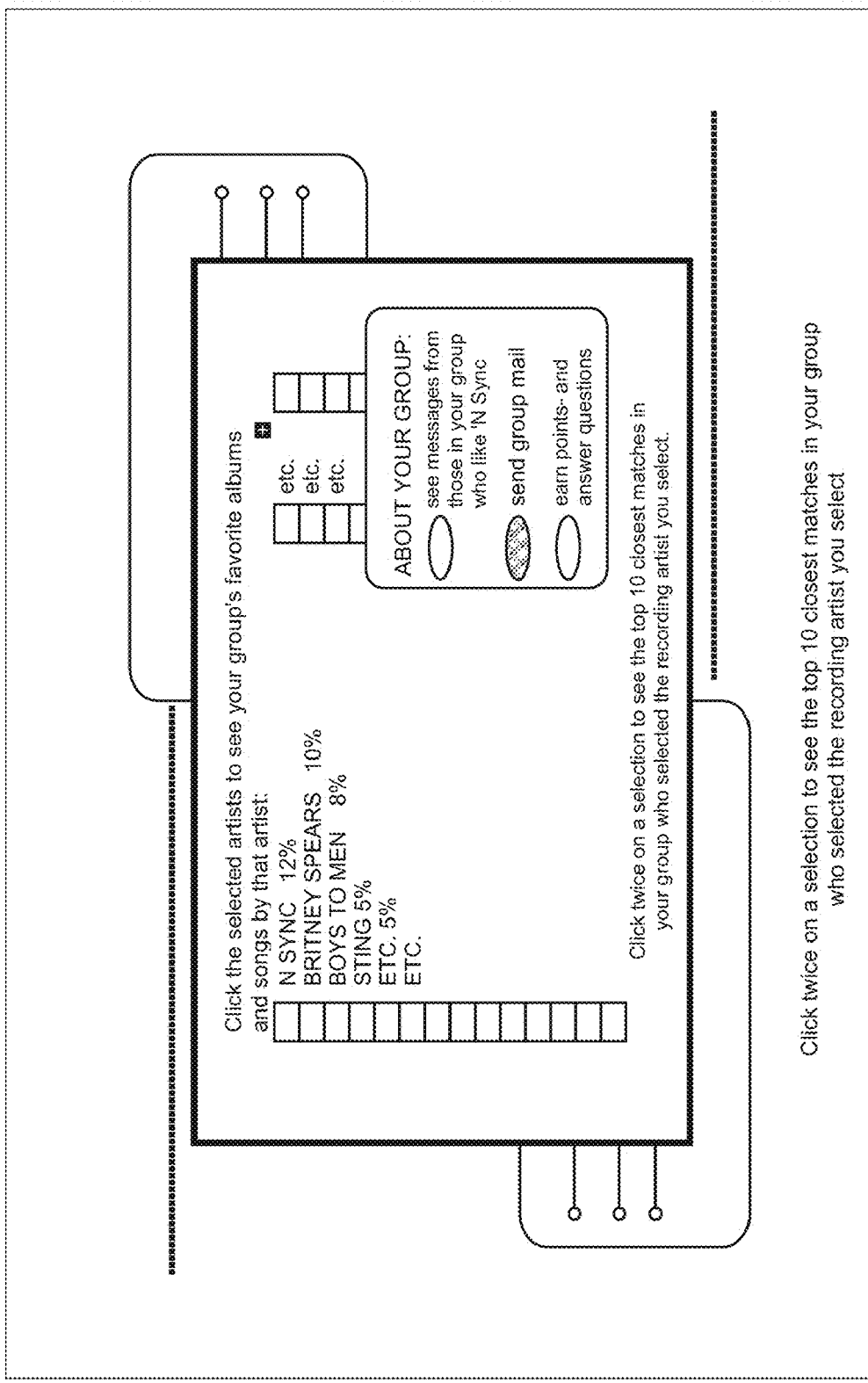
FIG. 11A illustrates a database correlation results report, detailing current music preferences of the user-defined demographic grouping of database profiles, i.e., people. This Internet screen report further provides interactive options to the user in defining the next stage of their search, including more discreet data related to the music results showcased, and the option of displaying a selected number of actual database "members," or users who have profiles within the database, who meet selected similarity criteria to the users' selected trait and preference parameters.
Figure 11B:
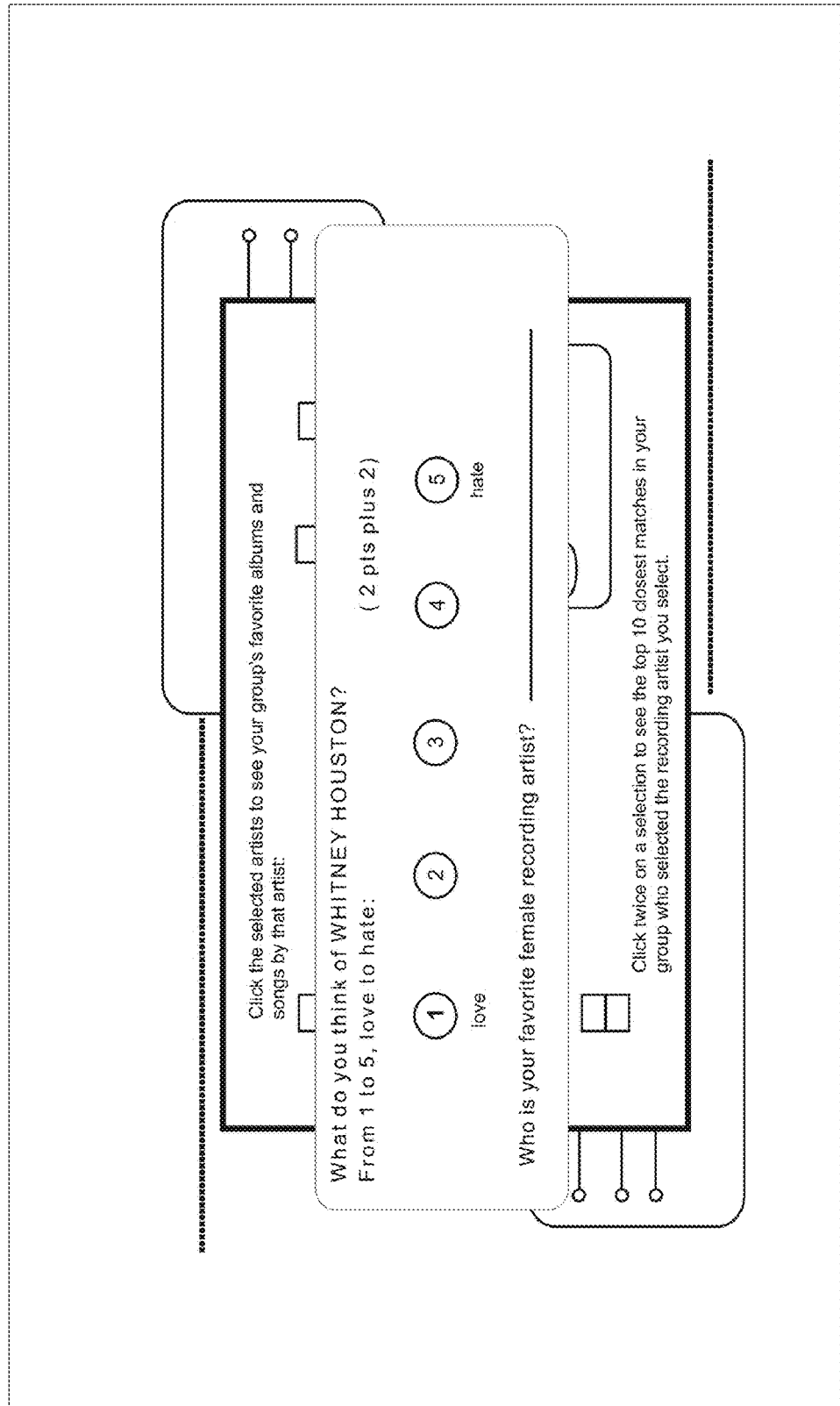
FIG. 11B illustrates a selected "focus group" study prompt, provided to this particular user, the user having met requirements to be considered relevant to the focus group data gathering needs. Naturally, this service and function of the present invention is a revenue aspect, allowing advertisers and brands to derive incredibly discreet demographic specific feedback virtually immediately, by way of services based on the present invention.

Further, focus group data, or consumer preference sampling may be accomplished with immediacy and unrivaled relevance, as only users and members of selected relevance to the data solicitation might be contacted (FIG. 11.5.) Accordingly, discreet trait and preference specific groups of individuals that would be virtually impossible to locate and sample with typical focus group approaches are capable of being located and sampled with the present system. For example, a movie company might give a "bio" of a new film, and submit a question that the system would relay only to users who are women between 18 and 24 who show a particular interest in fashion and beauty, the question being: "Which of the following actresses would be most likely to get you in to the theatre, should they play this role in this movie?" A write in option could naturally also be provided, for unsupplied response options. The result being, firms in every industry can solicit focus group information from remarkably targeted, and immediately accessible consumers.

The present invention provides a new level of Internet options and service, based more on a "thinking" model than a "factual" model, where absolutes are not what is sought by users but information found between who the user is (or the "type" of person they are shopping or researching about,) and who those profiled in the database are, and what and how they choose in the context of how they feel, look and behave. This invention is a "human search engine" of the Internet, and a database that allows the user, or SEARCHER, to search human preferences and feedback, based on human traits and parameter options. Further, this invention provides the internet user the proactive control over sampling, instead of the familiar approach of the Internet world to passively sample Internet users based on their general activity on the web, such as what sites they visit frequently, etc. This is a slow and inefficient means to learn from users who are able to proactively provide discreet data about themselves, by seeking discreet data for their personal needs and reference. This is the function of the present invention.

In a preferred configuration, the "micro-demographic" of the USER or searcher, is first determined through a trait-based selection process, (FIG. 6) wherein selected definitive and variable traits are selected and ranked by the user by relevance and importance to that user's search. The scope of the database similar to the parameters might be user defined then, based on system-supplied options (FIG. 8.) Secondarily, the "preference" options of interest to that user (FIG. 9) are provided, to allow for very discreet areas of feedback to be compared about and within the users identified "trait based micro-demographic" of interest. In navigating a user's selected group's, or demographic's, preferences and feedback, options for continual "refinement" of the demographic being searched are selectively provided to "tailor" the group being studied to user priorities as they may change during a single search.

Typical shopping means on the Internet currently include searches by product or service type, searches by brand name, and personal shopper assistance from a "helper" that is not necessarily defined by the user, unlike the present invention. By sharing preferences, opinions and personal observations about self and others in the context of purchasable items and general human interest information, a venue not only for newly informed purchasing is created, but a forum for support, gift ideas, self-improvement and broader awareness of others among other results is also created. For instance, an overweight person embodying certain specific insecurities and physical circumstances, might find new ideas of what to wear to address appearance concerns by referencing people with similar circumstances, and their recommendations, observations and preferences.

That same person might learn how other similar "overweight people" deal with people who react negatively to "overweight" people; or how "thin" people feel about their own appearances, and the appearances of people the consider to be "overweight." Further, a new business woman with specific physical and emotional traits, unsure of what to wear on the job might find her best recommendations from business women whose feedback and selections educate her to ways to advantage her in the new circumstance, from those who have already experienced it. And, a young woman wondering whether to date a certain man can reference personal feedback from both women like herself and men she deems to be similar to her potential date, for broader awareness of both perspectives in decision making; whether data is product and service related, or simply selected personal and emotional feedback.

Perhaps more importantly, that person may have entered in to a search with "weight issues" on their mind initially, and ended up focusing on people who share a common travel interest, as an exciting range of featured preferences and opinions of members, or profiles, may be revelations that steer a user in to new areas of interest, increasing commercial versatility and reach of the invention for advertisers.

A vital aspect of the invention is the fact that the "MEMBERS" or those people who have belong to the database of the present invention, having willingly, directly and proactively supplied data about themselves to the database. By prompting SEARCHERS to "join," discreetly or with incentives, or with the requirement to answer selected relevant questions in order to further use the database, or to go to a deeper level in the database (such as to review long form, written feedback from members,) the database of the present invention can be virtually "self feeding" for information. Further, as the SEARCHER or user is seeking true information, it is unlikely they will lie or deceive in supplying data to the database, as their mind-set, or "mode" will be truthful and to think to supply deceptive data while searching what they anticipate is true data, is unlikely.

The additional option of still images and video (FIGS. 7 and 8) may be provided by members as further personal "data" compiled within the database is important. In being able to review still or motion visual content, or photos, or selected real people who have provided these images to the venue or site (perhaps in exchange for selected rewards,) the shopper/user can identify further those people of interest and those other consumers who's choices are of interest and relevance to the shopper/user in determining their own choices.

In being able to reference as broad or as narrow a category of people to review, (those "most similar to the search parameters" for instance,) very discreet and emotionally based choices can be made by way of the options of the present invention, tapping in to variables more closely associated with self esteem, role model emulation and personal aspects of featured people. Searches may include several "rounds" or refinements, wherein a final stage of selection by a user in creating their micro-demographic of interest may include reviewing available photos, or responses in manually input fields, for more specific member selection (FIGS. 12 and 16). The option of excluding members (FIG. 8) who do not have photos available is selectively an option, to maintain interest for more visual searchers/users.

On selecting a single member to review, including long-form feedback available (FIG. 14), a search might be broadened from "self esteem" issues for example, to "car preferences," wherein the searcher can broaden the scope of the search at that point to sample his entire group (or originally designated trait-based micro-demographic), to review their overall preferences on the new topic by percentage (FIG. 16). This option demonstrates the selectable versatility of searches of databases of the present invention, as the choice to reference "car preferences" was prompted by the profile/feedback screen of a single member, who was referenced by the searcher/user based on an entirely separate area, or motivation, of interest/curiosity.

Figure 15:
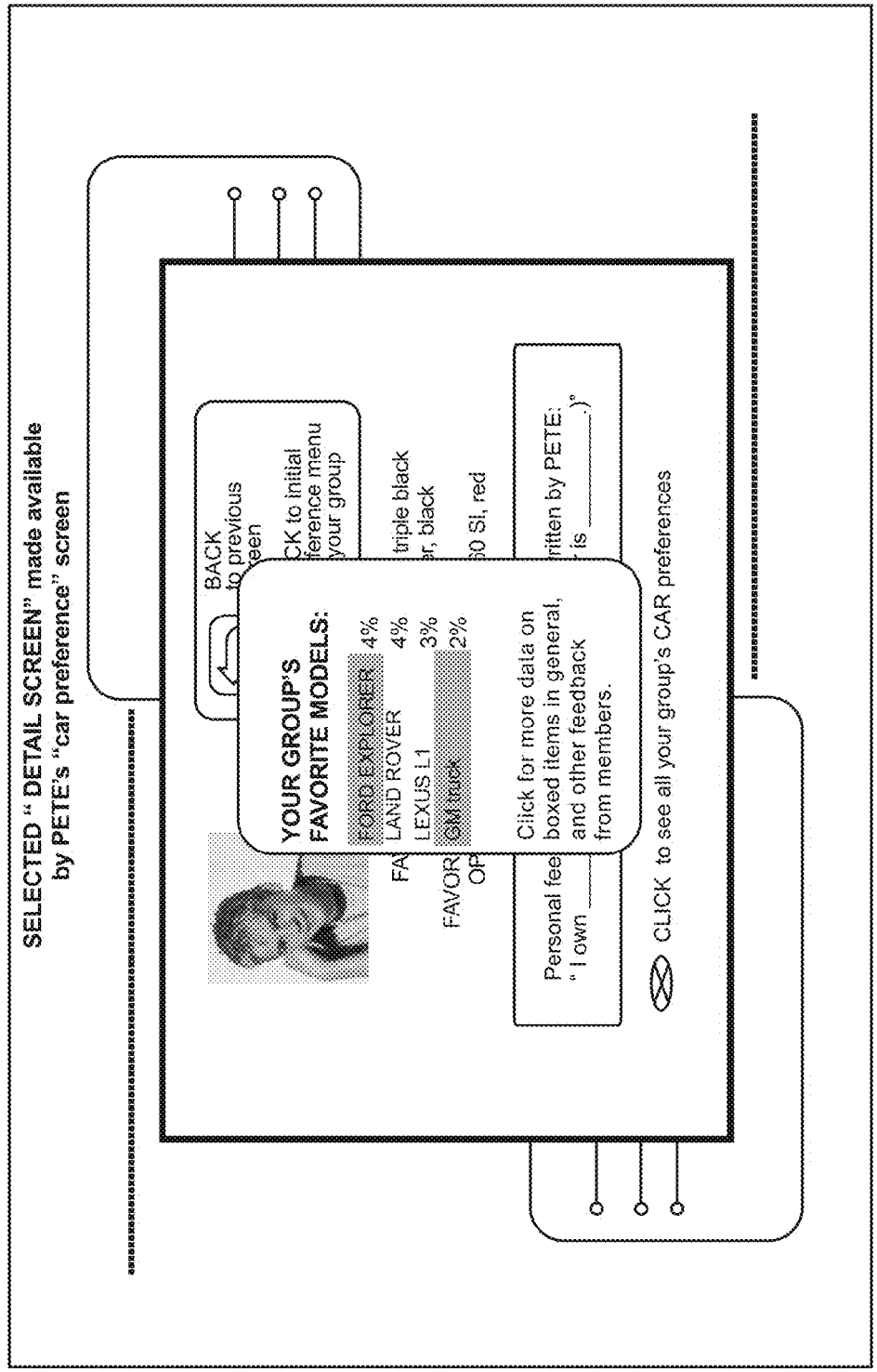

Options in reviewing response data, specific to products and services for instance, may include a correlation of both product "types" and brands and/or styles within the selected micro-demographic identified by a user. For instance, within the trait data a user has input, 50 members constitute the top 1% of members most closely related to the user's selections. The user is interested in seeing what cars his selected micro-demographic prefers (FIG. 15.)

The database is referenced by the site in response to the user's search, and the search result provided to the user confirms that 10 of the 50 members in the 1% correlation group prefer SPORT UTILITY VEHICLES; on requesting brand preference, the user is supplied with the information that 5 of those 10, or half, prefer the FORD EXPLORER, 2 of those 5 own a FORD EXPLORER, and 4 of the 10 prefer the color BLACK in a SPORT UTILITY VEHICLE. In another search, a user may determine that he wants to use the top 100 members closest to his search parameters: of these members, the user is curious what watches the group owns; the site search of the database determines that the user-selected micro-demographic includes 92 members that own watches, of them the top brand is ROLEX, of which 24% of the demographic owns, 35% of that 24% (who own Rolex's) own a PRESIDENTIAL model in Gold. In a more general search regarding watches, the user also learns that his uniquely created demographic prefers SPORT watches (52%) over any other category "type" of watch. "Long form data" review of a selected member (due to interest in her photo,) within the trait-group reveals to the searcher that this member of special interest to him/her is feels that "people with gold watches are often unfaithful to their spouses."

Such multi-leveled searches may be configured according to percentage of respondents meeting a selected degree of correlation with a user's input search data, (FIG. 17,) or a selected number of members coming closest to matching said user's data, or "bin" of members built by a user from his own personal criteria (unrelated to database means for correlation.) The means and options for correlation and member micro-demographic selection by a site referencing the database, or by a user, is virtually infinite, much the way the entire database of the internet may be referenced and cross-referenced in a multitude of ways, by way of search engines that approach the task in a variety of different ways.

The consumer preference data collected by this site would be of considerable value to many, as the discreet categories of traits and personal profile aspects could be as narrow as desired by those operating site(s) and venues utilizing the options provided by this invention. Far more detailed than just age and "who bought what where" data, the present invention takes demographic data to an entirely new level. Specific, relevant questions may selectively be "purchased" by firms needing feedback from the unique preference and/or trait-based demographics provided by databases of the present invention.

The present invention could further involve data to be provided based on sub "categories" determined directly by users/shoppers, by way of a key-in means, allowing for unlimited options to be relayed from users, for selected processing and categorizing based on correlation between data related to trait and human aspect categories offered directly by users, not having been yet made available as a "pull down" or on-screen icon option. A demographic might even be identified by user's by requesting members who identified a new sub-category manually, that had not been presented within supplied (pull down menu) options, for instance (FIG. 6).

Further, the present invention could provide options including selected processing of the data from users/shoppers, including the option of people (specifically provided to review the database,) reviewing and categorizing data from respondents according to parameters relevant to the site needs, or venue needs, to define selected data-groupings of member feedback. In other words, human involvement in reviewing more complex data from members might provide additional sectors of information within the database that might not have been categorized or included as they may have required human interpretation to be placed subjectively in to a searchable bin, or data category.

A virtually infinite number of "micro-demographics" can be created and made available for users to reference, with selected "narrowness of focus" in pin pointing groups and types of people; it is possible that no two users may ever identify the same demographic in a search.

One very important aspect of the present invention is that application options based on this invention might allow for direct shopping, or items actually purchased by way of site(s) featuring options created by this invention, or such site(s) might refer users/shoppers to other sites via links, once preferences have been identified that have a corresponding site for more information and in some cases sites for transacting purchases of items displayed in accordance with searches by trait conducted by way of the method and system of the present invention. Links back to a site such as one(s) created based on the present art, could be made from vendors including in links from such site(s) based on this art, increasing the user base and providing a research and information service to consumers made available by the links from other sites. Listing brands as options and suggestions in both searcher and member pull-down screen options, (FIG. 15) is saleable to advertisers and brands to be "out of site" is "out of mind," so the desire to be included in the database results could be very strong for advertisers; links to their sites or purchasing means is secondarily a potentially saleable option as well (FIGS. 7, 10 and 15.) In identifying special and perhaps unusual personal areas of interest, uniquely targeted and formatted advertising opportunities may be created.

The present invention may provide a selectively "pure" database that in no way is biased toward any selected options or brands, or the database may allow for all possible selections, but provide greater visibility and promotion of selected brands within user selected categories. Naturally, should the scenario be the latter, keyed-in options that may not be a brand that is specially featured, may provide search options listing brands or options that were not within site-supplied names; in this scenario, such a brand or name could be listed in the results, showing the degree of correlation; though, the inclusion of a link to that brand or supplier's own site, or the provision of direct shopping means of their items, or inclusion within pull down menus (due to a brand or name's popularity with members,) is at the option of the database owner (FIG. 15.) Having said that, the option of selling products and services, or providing other referral and information services directly to users and members is possible, is an aspect of the present invention, and is also an option of the database owner, or owner of the site/searching means of a database based on the present invention.

The options of the present invention could be featured as the primary and independent searching means in selected site(s) involving the methods or system herein, though they could also be incorporated as aspects of a conventional, existing or familiar e-commerce site, providing additional referencing latitude to the shopping and/or utilization of said site(s.) Thus, shopping could be done by product in the familiar ways, such as by product category, and by way of the special trait and human profiling and characteristics the user selected/created micro-demographic referencing method of the present invention provides.

The application of sites that access a database based on the present invention also includes a myriad of options. For instance, a publishing company that owns several magazine titles, may have such a site. In this scenario, promotions within their magazines might draw consumers to the site, to become members and to provide core data to the database; those new members might receive selectively large incentives, whether gifts or winning potential, based on the amount of data input, meaning that selectively a member who supplies a photo or video of himself would qualify for more reward. Such a publisher might provide SELECTED brands or clients within pull down screen (site presented) options to users, as the owner of the site would have control over the categories of trait and preference data members and users receive as prompts from the site.

Further, the brands listed within commercially based options and pull-down menus, might include brands that are paying to be listed, or brands that are qualifying to be listed as determined by the publisher. Meaning, the value of controlling such a database for a firm such as a publishing company, includes the ability to provide incentives to advertisers (or selected companies,) to be included in lists that would make their brand, product or service a visible option to members and users, increasing the likelihood of their brand and product being listed and referenced in searches by users.

Further, selected brands meeting criteria determined by the publisher in this case, (or owner of the database in a broader sense,) may have their brand or name listed in bold and featuring a direct LINK to their own site, meaning that the site based on the present invention could potentially draw clients and buyers directly to selected brands' information and/or e-commerce sites, at the user's option. Further, members and/or users who input selections specific to brands meeting criteria of the database owner, may be prompted to allow for materials or other solicitations to be sent to them by selected brands, or product/service providers. Whether cooped with a publisher, a separate conventional search engine, or other property including e-commerce sites, configurations of the present invention for Internet application are many.

Figure 9:
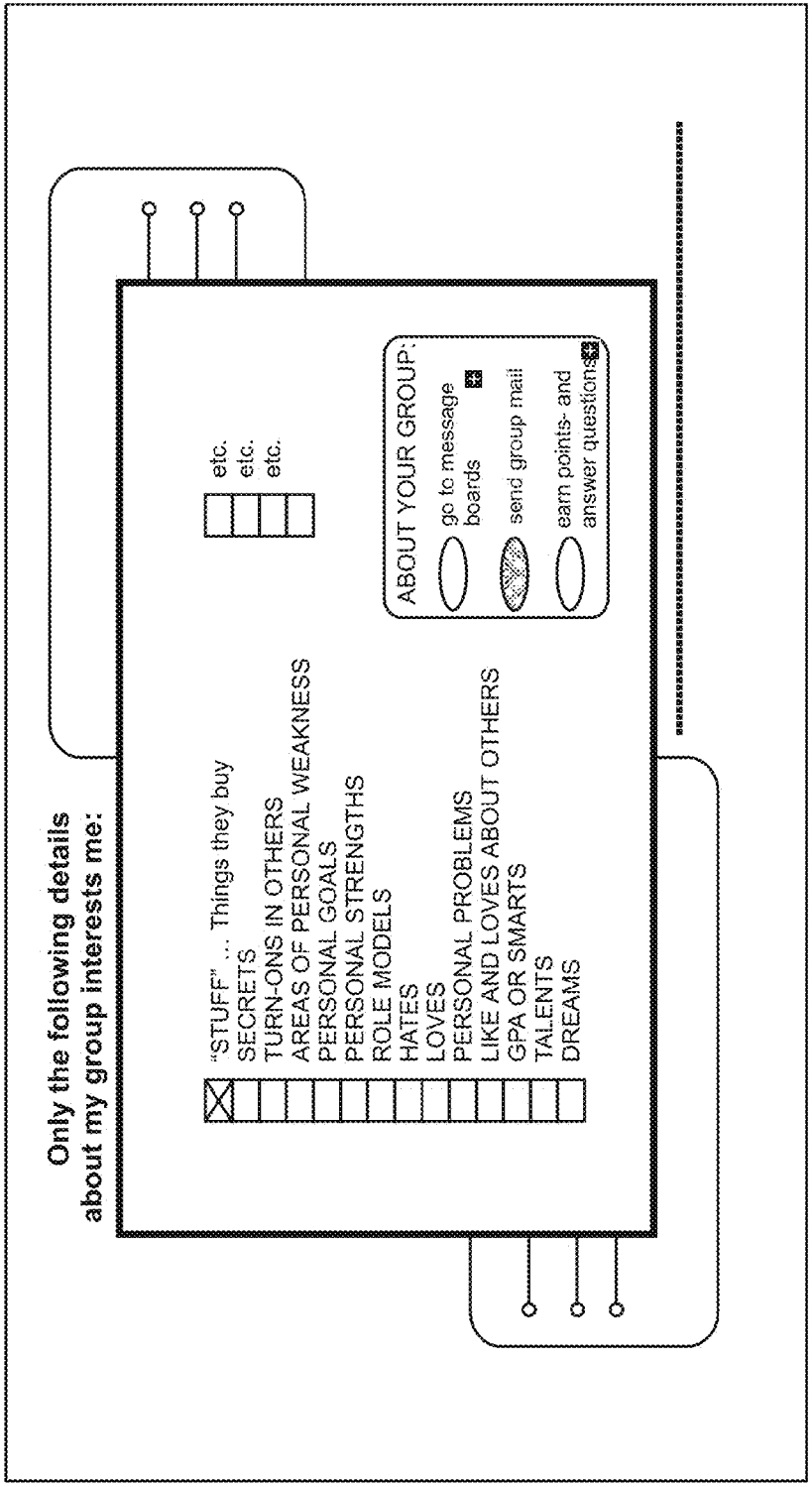

Enormously valuable ADVERTISING means are created that transcend existing Internet advertising options, as the present invention targets the messages with not only demographic specificity, but content and topic relevance to each individual user, or searcher. The option of search-relevant FACTOIDS which includes advertising as an aspect of a statistic from the database relevant to the searcher, relevance being a option determined by the database configuration, could provide new interest around advertising messages— each message seemingly personally created and recalled for each searcher/user. These advertising options and values are demonstrated in an example SEARCH in the SCREEN diagrams enclosed. Beyond the ability to target searchers, the ability to connect with members by posting and email means, are powerful:

This area of SERVICE to users and advertisers involves uniquely targeted EMAIL (FIGS. 9, 11 and 13,) messages usable by users or searchers and selectively by advertisers. The option of uniquely assembled, individual user-relevant posting boards (FIG. 9.) As each searcher/user identifies traits and preferences of relevance to their search, a constantly refined group of "most relevant" members to that search is assembled, and revised. With the option of "group e-mail" and group posting boards, messages may be sent by searchers/users selectively to members relevant to a particular phase of their search, to gain the most useful or relevant feedback from the membership. For example, a searcher may want to pose a question to the top ten relevant members who are within their trait-based demographic group, who are diabetic, or who feel FRANK SINATRA was the best male singer ever.

Message postings could appear in unique combinations, by topic or member relevance, as a searcher/user accesses boards. Should a searcher find a preference based topic to be the priority, the potential of posting or reviewing boards related to the topic from the entire database membership is an example of versatility in searching the preferred configuration of sites based on the present invention should embody. Naturally handpicked members could be sent messages selectively, as a function of a closed e-mail system within a service site involving the database of the present invention. Advertisers included based on their demographic desires and selectively by their relevance to a given search, may email and post to their "dream demographics," and likely have their advertising received by the audience with interest and willingness to read and "link." This, because the interest level and relevance to that member was predetermined to be above a selected level, or threshold, by parameters selectively determined as the construct of the database's categorization.

Further disclosure is included in the following presentation style "snapshot" of the invention as used in a configuration, called "SHOP BY PROFILE", including a series of screen examples that demonstrate some of the options a SEARCHER might encounter while searching for preference information about a selected "type" of people who he/she has defined by selected trait variables, input by the SEARCHER. The SCREEN diagrams, which demonstrate an application of the present invention, are described in the following, in a scenario that encounters and details many of the options for configuration based on the system and method of the present invention, including the versatility and value of the searchable database options, and the advertising and revenue potential of an Internet site configured from aspects of the present invention.

The nature of the present invention is such that one skilled in the art of writing computer executable code (software), will be able to implement the described functions using one or a combination of popular computer programming languages such as "C++", Visual Basic, Java or HTML and/or web application development environments. As discussed above, one of the functions performed by the system is operation as a web site.

A web site typically communicates with web browsers using the hypertext transfer protocol (HTTP) to send and receive data including hypertext mark-up language (HTML) web page data and executable JAVA Applets. Of course, any known data transfer protocol and web site configuration/definition language can be used to implement the present system as shown in the accompanying figures.

Although the present invention is described by way of example herein in terms of a web based system using web browsers and a site processors, the system is not limited to that particular configuration. It is contemplated that the system can be arranged such that user terminals can communicate with, and display data received from the system using any known communication and display method, for example, using a non-Internet browser WINDOWS viewer coupled with local area network protocol such as Internetwork Packet Exchange (IPX).

Figure 18:
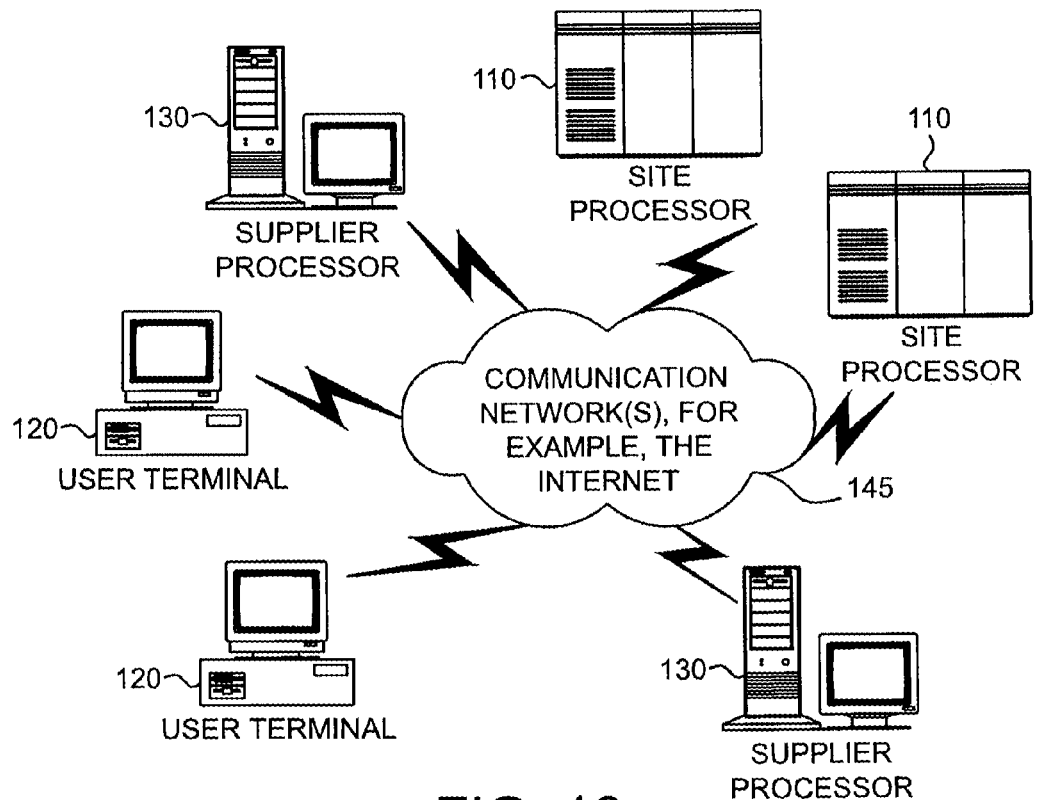
FIG. 18 illustrates one or more site processors, one or more user terminals and one or more supplier processors coupled together through a communication network in accordance with an embodiment.

As shown in FIG. 18, the system in accordance with the present invention includes one or more site processors 110, one or more user terminals 120 and one or more supplier processors 130 coupled together through communication network 145.

Although shown as a single communication network, communication network 145 can be comprised of multiple interconnected networks, for example the Internet. As such, communication network 145 can be any communication network, but is typically the Internet or some other global computer network. Communications between the elements of the present system can be implemented using any known arrangements for accessing the communication network 145, such as dial-up serial line interface protocol/point-to-point protocol (SLIP/PPP), Integrated Services Digital Network (ISDN), dedicated leased-line services, broadband (cable) access, frame relay, Digital Subscriber Line (DSL), asynchronous transfer mode (ATM) or other access techniques.

The user terminals 120 have the ability to send and receive data across communication network 145, and the ability to display the received data on a display device using appropriate communication software such as an Internet web browser. By way of example, terminal 120 may be a personal computer such as an INTEL PENTIUM-based computer or an APPLE MACINTOSH computer, but is not limited to such. Other such terminals which can communicate using a global computer network such as palm top computers, personal digital assistants (PDAs) and mass-marketed Internet access devices, i.e., WEB TV, can be used.

Accordingly the user terminals 120 provide access to the site processor 110 for the purpose of accessing the electronic architecture (database and database management system) of the present invention. The system software which controls the above-described functions relies primarily on the one or more site processors 110. Site processors 110 typically communicate with network 145 across a permanent i.e., unswitched, communication link. Permanent connectivity ensures that access to server 110 is always available to terminals 120.

Site processors 110 can be any appropriately sized computing platform, the storage, processing and other functional capacities of which are determined based on expected user activity and data storage requirements. For example, site processors 110 can be server-type personal computers, mini-computers such as UNIX-based servers, and even mainframe computers.

Supply processors 130 are preferably owned and maintained by the entities of supplying goods and services for marketing. Supply processors 130 are preferably used for receiving demographics, marketing and sales data from site processors 110 and for providing corporate, product and service and other relevant information to site processors 110, terminals 120 and LIVE SHOW processors 140. Further, orders for goods and services placed by users via user/player terminal 120 can be accepted directly from user terminals 120 or via site processors 110.

Figure 19:
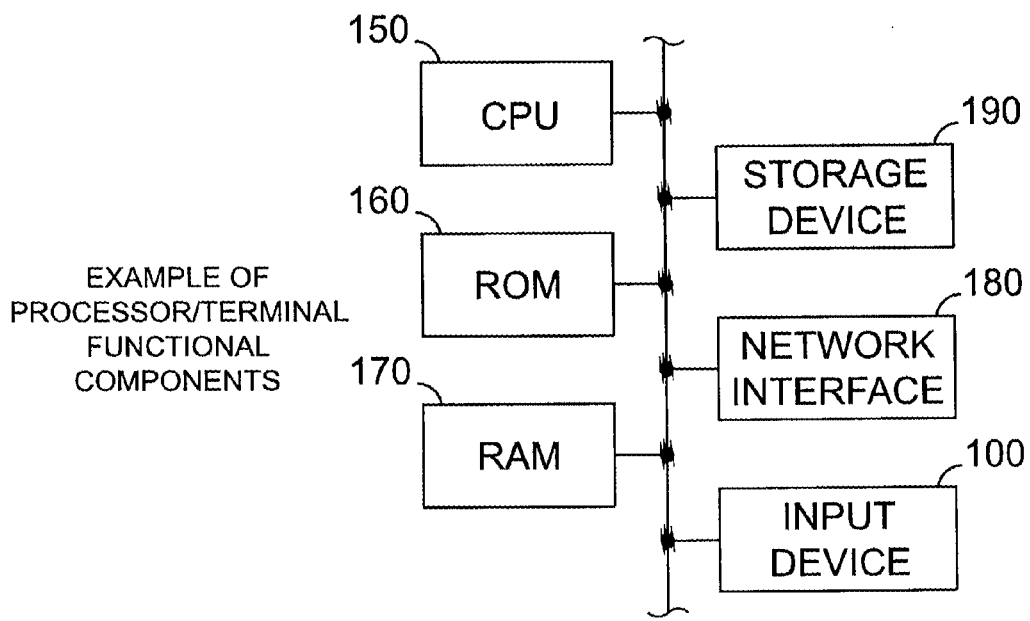
FIG. 19 illustrates functional elements of a site processor in accordance with an embodiment.

As shown in FIG. 19, the functional elements of each site processor 110 preferably include a central processing unit (CPU) 150 used to execute software code in order to control the operation of the server, read only memory (ROM) 160, random access memory (RAM) 170, at least one network interface 180 to transmit and receive data to and from other computer devices across communication network 145, storage devices 190 such as a hard disk drive, floppy disk drive, tape drive, CD-ROM, DVD-ROM and the like for storing program code, databases and application data, and one or more input devices 100, such as a keyboard and mouse.

The various components of site processor 110 need not be physically contained within the same chassis or even be located in a single location. For example, the database on storage device 190 may be located at a site which is remote from the remaining elements of site processor 110, and may even be connected to CPU 150 across communication network 145 via network interface 180.

Terminals 120 and supply processors 130 are preferably comprised of the same or subset of the functional components described with respect to the site processors 110. Of course, the functional components of these devices are sized to accommodate capacities appropriate for their usage. For example, terminals 120 may include more sophisticated displays and display driving hardware than the other elements, but may contain a smaller storage device, and less powerful CPU 150 than the other components. Also, supplier processor 130 may contain a more powerful CPU 150 than site processor 110, especially in the case where supplier processor 130 is implemented by a large corporation with a sophisticated Internet presence.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method comprising the steps of:
   (a) storing, on one or more processor readable media that are operatively coupled to one or more processors, at least one database comprising:
   (i) electronic user information representing at least one selected from a group of trait and preference of a respective person of a plurality of persons;
   (ii) electronic identification information representing at least one selected from a group of visual, audio and textual information of a respective person of the plurality of persons;
   (iii) electronic advertiser relevant information representing at least one selected from a group of products and services associated with a respective one of a plurality of advertisers and further related to at least one selected from a group of trait and preference respectively valued by one or more of the plurality of advertisers; and (iv) electronic advertiser information representing at least one selected from a group of advertiser name, product and service associated with a respective advertiser of the plurality of advertisers;

(b) receiving, via a communication device that is operatively connected to the one or more processors, a first electronic request for information, from a first user computing device operated by a first user, related to at least one person in a first group of persons, wherein the first group of persons is defined by at least one selected from a first group of trait information and preference information stored in the at least one database;

(c) determining, by the one or more processors, first electronic responsive information that is at least responsive to the first electronic request;

(d) transmitting, via the communication device to the first user computing device, the first electronic responsive information;

(e) generating, by the one or more processors, first electronic advertiser information in accordance with at least a determination that at least some of the electronic user information associated with the first user corresponds with at least some of the electronic advertiser relevant information associated with at least one of the plurality of advertisers, wherein the first electronic advertiser information includes a brand of the at least one of the plurality of advertisers and further wherein the first electronic advertiser information relates to a second group of persons defined by at least one selected from a second group of trait information and preference information, stored in the at least one database, wherein at least one selected from the second group of trait information and preference information relates to at least one person in the first group of persons, further wherein the second group of trait information and preference information is distinct from the first group of trait information and preference information by at least one of a trait and preference and further wherein the second group of persons is distinct from the first group of persons by at least one person;

(f) selecting, by the one or more processors, first electronic identification information from the electronic identification information that is associated with at least one person who is within the second group of persons;

(g) transmitting, via the communication device to the first user computing device, at least some of the first electronic advertiser information and the first electronic identification information; and (h) transmitting, via the communication device to the first user computing device, at least one electronic prompt that provides at least access to initiate an exchange of content between the first user and at least one user associated with the second group of persons.

2. The method of claim 1, further comprising:
(i) receiving, via the communication device from the first user computing device, at least electronic message information associated with the content.

3. The method of claim 1, further comprising:
(i) receiving, via the communication device from the first user computing device, at least electronic information associated with the content.

4. The method of claim 1, further comprising the steps of:
(i) determining, by the one or more processors, second electronic fact information that comprises information related to at least one trait of the first group of persons; and
(j) transmitting, via the communication device, to the first user computing device, the second electronic fact information.

5. The method of claim 1, wherein the first electronic advertiser information further comprises a second electronic request for information valued by the at least one of the plurality of advertisers.

6. The method of claim 5, further comprising the step of:
(i) receiving, via the communication device, second electronic responsive information, from the first user computing device operated by the first user, wherein the second electronic responsive information is at least responsive to the second electronic request.

7. The method of claim 1, wherein the first electronic advertiser information further comprises at least one statement of fact that comprises at least one trait or preference from the second group of persons that relates to at least one brand of good or service associated with the at least one of the plurality of advertisers.

8. The method of claim 7, wherein the first electronic advertiser information further relates to at least one brand of good or service that is not associated with the at least one of the plurality of advertisers.

9. The method of claim 1, wherein at least one of the first electronic responsive information and the first electronic advertiser information comprises a link to a website operated by the at least one of the plurality advertisers.

10. The method of claim 1, wherein the at least some of the electronic user information associated with the first user is identified in response to a request for electronic information received from the first user computing device.

11. The method of claim 1, wherein at least some of the first electronic advertiser information is provided electronically by an advertiser.

12. The method of claim 1, wherein the first electronic advertiser information further comprises editorial comments with Internet links.

13. The method of claim 1, wherein at least one trait or preference of the second group of persons is included in the first group of persons.

14. The method of claim 1, wherein at least none of the traits and preferences of the second group of persons are included in the first group of persons.

15. The method of claim 1, wherein the transmitting steps of steps (d) and (g) occur at substantially the same time.

16. The method of claim 1, wherein the transmitting steps of steps (d) and (g) occur at different times.

17. The method of claim 1, wherein the transmitting steps of steps (d) and (g) are combined as a single operational step.

18. The method of claim 1, wherein the determining and generating steps of steps (c) and (e), respectively, are performed at substantially the same time.

19. The method of claim 1, wherein the determining and generating steps of steps (c) and (e), respectively, are performed at different times.

20. The method of claim 1, wherein the determining and generating steps of steps (c) and (e), respectively, are combined as a single operational step.

21. The method of claim 1, wherein at least one of the transmitting steps of steps (d) and (g) is performed prior to the generating step of step (e).

22. The method of claim 1, wherein at least one of the transmitting steps of steps (d) and (g) is performed subsequent to the generating step of step (e).

23. The method of claim 4, wherein the steps of (i) and (j) occur before the step of (e).

24. The method of claim 4, wherein the steps of (i) and (j) occur after the step of (e).

25. The method of claim 4, wherein the steps of (i) and (j) occur after the step of (f).

26. The method of claim 1, wherein the first electronic advertiser information further comprises information which has not been requested by the first user computing device.

27. The method of claim 1, wherein the exchange is provided electronically via an electronic message board.

28. The method of claim 1, wherein the exchange is provided electronically by e-mail message.

29. The method of claim 1, wherein the visual information comprises still images, motion images or both still and motion images.

30. The method of claim 1, wherein the first user shares no trait or preference with the at least one selected from the first group of trait information and preference information.

31. The method of claim 1, wherein the first user shares no trait or preference with the at least one selected from the second group of trait information and preference information.

32. The method of claim 1, wherein the transmitting the first electronic advertiser information and electronic identification information occur at different times.

33. The method of claim 1, wherein the transmitting the first electronic advertiser information and the first electronic identification information occur at substantially the same time.

34. The method of claim 1, wherein the preference information includes at least one selected from a group of an interest and an opinion.

35. The method of claim 1, wherein the user information includes at least one respective user's past action.

36. The method of claim 1, wherein the content includes at least text.

37. The method of claim 1, wherein the electronic identification information includes at least a user name.

38. A system, the system comprising:
(a) one or more processor readable media;
(b) one or more processors operatively coupled to the one or more processor readable media;
(c) at least one database stored on the one or more processor readable media, the at least one database comprising:
  (i) electronic user information representing at least one selected from a group of trait and preference of a respective person of a plurality of persons;
  (ii) electronic identification information representing at least one selected from a group of visual, audio and textual information of a respective person of the plurality of persons;
  (iii) electronic advertiser relevant information representing at least one selected from a group of products and services associated with a respective one of a plurality of advertisers and further related to at least one selected from a group of trait and preference respectively valued by one or more of the plurality of advertisers; and
  (iv) electronic advertiser information representing at least one selected from a group of advertiser name, product and service associated with a respective advertiser of the plurality of advertisers;
(d) the one or more processor readable media having instructions for causing the following steps to be performed by the one or more processors:
  (i) receiving, via a communication device that is operatively connected to the one or more processors, a first electronic request for information, from a first user computing device operated by a first user, related to at least one person in a first group of persons, wherein the first group of persons is defined by at least one selected from a first group of trait information and preference information stored in the at least one database;
  (ii) determining, by the one or more processors, first electronic responsive information that is at least responsive to the first electronic request;
  (iii) transmitting, via the communication device to the first user computing device, the first electronic responsive information;
  (iv) generating, by the one or more processors, first electronic advertiser information in accordance with at least a determination that at least some of the electronic user information associated with the first user corresponds with at least some of the electronic advertiser relevant information associated with at least one of the plurality of advertisers, wherein the first electronic advertiser information includes a brand of the at least one of the plurality of advertisers and further wherein the first electronic advertiser information relates to a second group of persons defined by at least one selected from a second group of trait information and preference information, stored in the at least one database, wherein at least one selected from the second group of trait information and preference information relates to at least one person in the first group of persons, further wherein the second group of trait information and preference information is distinct from the first group of trait information and preference information by at least one of a trait and preference and further wherein the second group of persons is distinct from the first group of persons by at least one person;
  (v) selecting, by the one or more processors, first electronic identification information from the electronic identification information that is associated with at least one person who is within the second group of persons;
  (vi) transmitting, via the communication device to the first user computing device, at least some of the first electronic advertiser information and the first electronic identification information; and
  (vii) transmitting, via the communication device to the first user computing device, at least one electronic prompt that provides at least access to initiate an exchange of content between the first user and at least one user associated with the second group of persons.

39. The system of claim 38, wherein the one or more processor readable media further have instructions for causing the one or more processors to perform the steps of:
(d)(viii) receiving, via the communication device from the first user computing device, at least electronic message information associated with the content.

40. The system of claim 38, wherein the one or more processor readable media further have instructions for causing the one or more processors to perform the steps of:
(d)(viii) receiving, via the communication device from the first user computing device, at least electronic information associated with the content.

41. The system of claim 38, wherein the one or more processor readable media further have instructions for causing the one or more processors to perform the steps of:
- (d)(viii) determining second electronic fact information that comprises information related to at least one trait of the first group of persons; and
- (d)(ix) transmitting to the first user computing device the second electronic fact information.

42. The system of claim 38, wherein the first electronic advertiser information further comprises a second electronic request for information valued by the at least one of the plurality of advertisers.

43. The system of claim 42, wherein the one or more processor readable media further have instructions for causing the one or more processors to perform the step of:
- receiving, via the communication device, second electronic responsive information, from the first user computing device operated by the first user, wherein the second electronic responsive information is at least responsive to the second electronic request.

44. The system of claim 38, wherein the first electronic advertiser information further comprises at least one statement of fact that comprises at least one trait or preference from the second group of persons that relates to at least one brand of good or service associated with the at least one of the plurality of advertisers.

45. The system of claim 44, wherein the first electronic advertiser information further relates to at least one brand of good or service that is not associated with the at least one of the plurality of advertisers.

46. The system of claim 38, wherein at least one of the first electronic responsive information and first electronic advertiser information comprises a link to a website operated by the at least one of the plurality of advertisers in connection with the advertiser relevant information.

47. The system of claim 38, wherein the at least some of the electronic user information associated with the first user is identified in response to a request for electronic information received from the first user computing device.

48. The system of claim 38, wherein at least some of the first electronic advertiser information is provided electronically by an advertiser.

49. The system of claim 38, wherein the first electronic advertiser information further comprises editorial comments with Internet links.

50. The system of claim 38, wherein at least one person within the second group of persons is within the first group of persons.

51. The system of claim 38, wherein at least one trait or preference of the second group of persons is included in the first group of persons.

52. The system of claim 38, wherein at least none of the traits and preferences of the second group of persons are included in the first group of persons.

53. The system of claim 38, wherein the transmitting steps of steps (d)(iii) and (d)(vi) occur at substantially the same time.

54. The system of claim 38, wherein the transmitting steps of steps (d)(iii) and (d)(vi) occur at different times.

55. The system of claim 38, wherein the transmitting steps of steps (d)(iii) and (d)(vi) are combined as a single operational step.

56. The system of claim 38, wherein the determining and generating steps of steps (d)(ii) and (d)(iv), respectively, are performed at substantially the same time.

57. The system of claim 38, wherein the determining and generating steps of steps (d)(ii) and (d)(iv), respectively, are performed at different times.

58. The system of claim 38, wherein the determining and generating steps of steps (d)(ii) and (d)(iv), respectively, are combined as a single operational step.

59. The system of claim 38, wherein at least one of the transmitting steps of steps (d)(iii) and (d)(vi) is performed prior to the generating step of step (d)(iv).

60. The system of claim 38, wherein at least one of the transmitting steps of (d)(iii) and (d)(vi) is performed subsequent to the generating step of step (d)(iv).

61. The system of claim 41, wherein the steps of (d)(viii) and (d)(ix) occur before the step of (d)(iv).

62. The system of claim 41, wherein the steps of (d)(viii) and (d)(ix) occur after the step of (d)(iv).

63. The system of claim 41, wherein the steps of (d)(viii) and (d)(ix) occur after the step of (d)(v).

64. The system of claim 38, wherein the first electronic advertiser information further comprises information which has not been requested by the first user computing device.

65. The system of claim 38, wherein the exchange is provided electronically via an electronic message board.

66. The system of claim 38, wherein the exchange is provided electronically by e-mail message.

67. The system of claim 38, wherein the visual information comprises still images, motion images or both still and motion images.

68. The system of claim 38, wherein the first user shares no trait or preference with the at least one selected from the first group of trait information and preference information.

69. The system of claim 38, wherein the first user shares no trait or preference with the at least one selected from the second group of trait information and preference information.

70. The system of claim 38, wherein the transmitting the first electronic advertiser information and the first electronic identification information occur at different times.

71. The system of claim 38, wherein the transmitting the first electronic advertiser information and the first electronic identification information occur at substantially the same time.

72. The system of claim 38, wherein the preference information includes at least one selected from a group of an interest and an opinion.

73. The system of claim 38, wherein the user information includes at least one respective user's past action.

74. The system of claim 38, wherein the content includes at least text.

75. The system of claim 38, wherein the electronic identification information includes at least a user name.

* * * * *

UNITED STATES PATENT AND TRADEMARK OFFICE
CERTIFICATE OF CORRECTION

PATENT NO.        : 8,219,446 B1
APPLICATION NO.   : 12/777070
DATED             : July 10, 2012
INVENTOR(S)       : Craig P. Mowry Page 1 of 1

It is certified that error appears in the above-identified patent and that said Letters Patent is hereby corrected as shown below:

In the Specification,

Column 9, line 24, the text "(FIG. 11.5.)" should be "(FIG. 11B)."

Signed and Sealed this
Second Day of June, 2015

Michelle K. Lee
*Director of the United States Patent and Trademark Office*